(12) United States Patent
Aoshima

(10) Patent No.: US 7,182,450 B2
(45) Date of Patent: Feb. 27, 2007

(54) INK COMPOSITION AND INKJET RECORDING METHOD

(75) Inventor: Keitaro Aoshima, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 251 days.

(21) Appl. No.: 10/932,195

(22) Filed: Sep. 2, 2004

(65) Prior Publication Data
US 2005/0046675 A1    Mar. 3, 2005

(30) Foreign Application Priority Data
Sep. 3, 2003    (JP) .............................. 2003-311082

(51) Int. Cl.
*B41J 2/17*    (2006.01)
*B41J 2/41*    (2006.01)

(52) U.S. Cl. ................... 347/95; 347/112; 347/100

(58) Field of Classification Search ................ 347/100, 347/96, 95, 101, 112; 523/160; 106/31.6, 106/31.13, 31.27
See application file for complete search history.

(56) References Cited

U.S. PATENT DOCUMENTS

| 6,158,844 A | 12/2000 | Murakami et al. |
| 2002/0058729 A1 | 5/2002 | Oshima |
| 2003/0134940 A1 | 7/2003 | Morrision et al. |

FOREIGN PATENT DOCUMENTS

JP    10-138493 A    5/1998

*Primary Examiner*—Manish S. Shah
(74) *Attorney, Agent, or Firm*—Sughrue Mion, PLLC

(57) ABSTRACT

In electrostatic inkjet recording in which an ink droplet is ejected by acting electrostatic force on ink that contains colorant particles, the electric conductivity of the colorant particles in the ink is saturated. Thus, variations in ink dot diameter caused by the ejection delay and a decrease in frequency responsivity are avoided, so that high-quality image recording with good frequency responsivity can be realized.

16 Claims, 4 Drawing Sheets

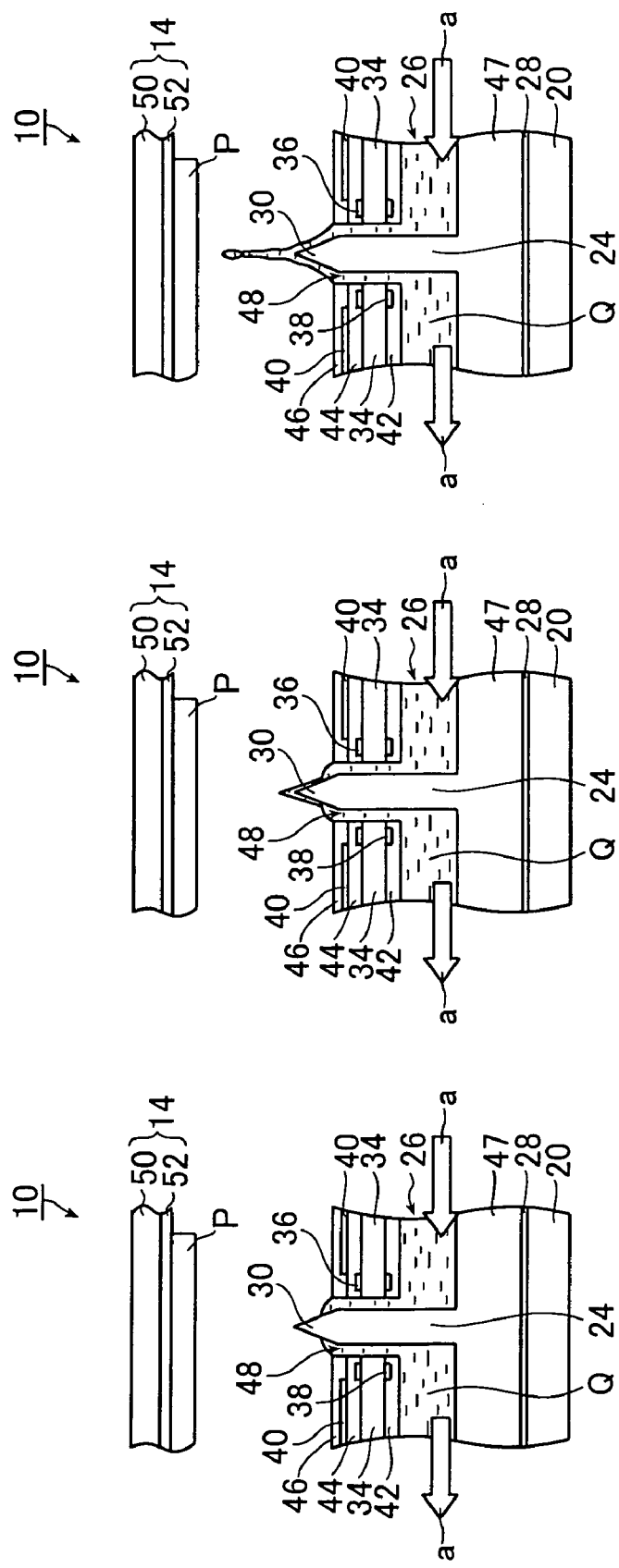

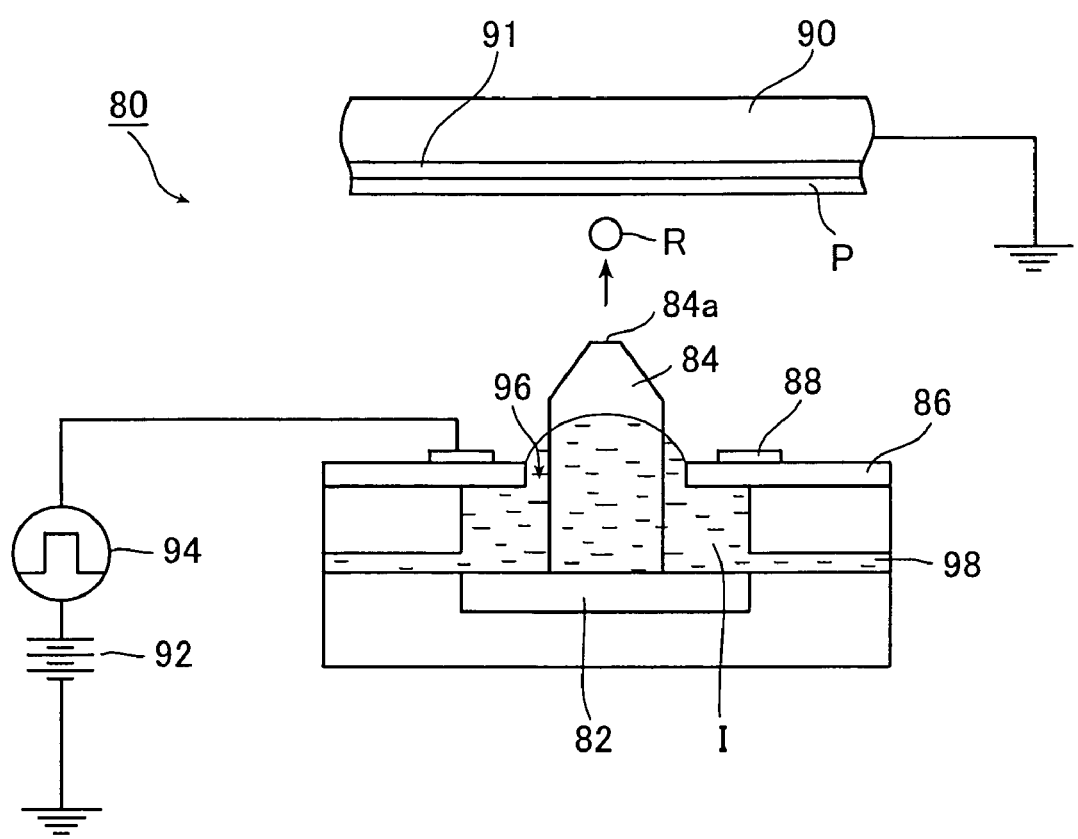

INK COMPOSITION AND INKJET RECORDING METHOD

BACKGROUND OF THE INVENTION

The present invention relates to an ink composition for an electrostatic inkjet system by which the ink composition can be ejected by utilizing an electrostatic field, and the present invention also relates to an inkjet recording method using the ink composition.

For electrostatic inkjet recording, an ink composition (hereinafter, referred to as ink) prepared by dispersing charged color fine particles in a dispersion medium is used and an image corresponding to image data is recorded on a recording medium by applying a predetermined voltage depending on the image data to each ejecting portion formed in an inkjet head to eject and control ink using electrostatic force.

Examples of an electrostatic inkjet recording apparatus known in the art include one disclosed in JP 10-138493 A.

FIG. 4 shows a schematic diagram of an inkjet head of the electrostatic inkjet recording apparatus disclosed in JP 10-138493 A.

An inkjet head 80 as shown includes a head substrate 82, an ink guide 84, an insulating substrate 86, a control electrode 88, an opposing electrode 90, a DC bias supply 92, and a pulse power supply 94.

Nozzles (through-holes) 96 for ejecting ink are formed in the insulating substrate 86. In addition, the head substrate 82 formed extends along the array of those nozzles 96. On the head substrate 82, each of the ink guides 84 is arranged at a position corresponding to the through-hole. The ink guide 84 extends through the nozzle 96 and its tip portion 84a protrudes from the surface of the insulating substrate 86 facing to a recording medium P.

The head substrate 82 and the insulating substrate 86 are arranged at a predetermined distance from each other and also a flow path 98 for ink I is formed between them.

The ink I including colorant-containing particles (colorant particles) which are charged with the same polarity as that of a voltage applied to the control electrode 88 is circulated in the ink flow path 98 from the right side to the left side in FIG. 4 by means of an ink circulating mechanism (not shown) to be supplied to each nozzle 96.

The control electrode 88 is formed in the shape of a ring and placed on the surface of the insulating substrate 86 facing to the recording medium P such that the nozzle 96 is surrounded with the control electrode 88. In addition, the control electrode 88 is connected to the pulse power supply 94 that generates a pulse voltage depending on image data, and also the pulse power supply 94 is grounded via the DC bias supply 92.

The recording medium P is held on an insulating layer 91 of the grounded opposing electrode 90 while being charged to a high reverse voltage with respect to the control electrode by means of a charging device such as a scorotron charging device. Therefore, in this system, the recording medium P acts as an opposing electrode and the high voltage of the recording medium P acts as a bias voltage.

In the electrostatic inkjet recording described above, when no voltage is applied to the control electrode 88, the Coulomb attraction between the bias voltage of the opposing electrode 90 and the colorant particles (charged particles) in ink, the viscosity and surface tension of the ink (dispersion medium), the repulsive force between the colorant particles, the fluid pressure of the ink supplied, and so on are combined and balanced in the form of meniscus as shown in FIG. 4 in which the ink I rises a little from the nozzle 96.

In addition, those factors including the Coulomb attraction allow the colorant particles to migrate to the meniscus. In other words, the ink I is concentrated.

When a voltage is applied to the control electrode 88, the drive voltage is superimposed on the bias voltage and as a result the ink I is sucked toward the recording medium P (opposing electrode), forming an ink liquid column in the shape of a generally cone, the so-called Taylor cone.

After the Taylor cone formation, as time passes further, the Coulomb attraction acting on the colorant particles and the surface tension of the dispersion medium become unbalanced, resulting in a spindly ink liquid column of a few micrometers to several tens of micrometers in diameter, which may be referred to as a thread because of thread-forming property (spinnability). After that, as time passes moreover, the tip of the thread becomes successively disrupted to eject liquid droplets of the ink I. The flying of the ink droplet R is also facilitated with the action of suction force caused by the bias voltage. Consequently, the ink droplet R reaches the recording medium P.

In the electrostatic inkjet recording, generally, an ejection voltage is applied to each control electrode 88 so that the control electrode 88 can be switched on/off to modulate the ink droplet R before ejection. Therefore, the on-demand ejection of the ink droplet R can be carried out depending on an image to be recorded.

Here, the frequency of disrupting the thread is far higher than the frequency of voltage application (the frequency of driving the control electrode 88 (pulse power supply 94)) required for ejecting the ink droplet R corresponding to a dot. Within the time period of a single application of the driving voltage, the thread is successively disrupted many times. In other words, a dot can be formed on the recording medium by multiple fine liquid droplets caused by the disruption of the thread. The electrostatic inkjet recording utilizes such a phenomenon to control the time period of applying a voltage (the so-called "pulse width") for the formation of a dot. Therefore, an improvement in uniformity of dot diameter on the recording medium P can be attained by adjusting the volume of the liquid droplet (or the number of the liquid droplets) for the formation of a dot. In addition, high gradation of image recording can be attained by carrying out the control of density gradation or the like by means of intentional adjustment of the dot diameter.

Although the electrostatic inkjet recording has such excellent characteristic features, the so-called "ejection delay" occurs as the need of a slight time lag from the start of voltage application to the control electrode 88 to the start of the ejection of a liquid droplet. The ejection delay serves as a cause of lowering controllability and so on.

More specifically, in the electrostatic inkjet recording, as described above, the ink composition forms the Taylor cone after the application of a voltage to the control electrode 88, a thread is then formed and grown, and the tip of the thread is disrupted to eject an ink droplet. The ejection delay is caused by the steps from the formation/growth to disruption of the thread.

In the electrostatic inkjet recording, the ejection delay serves as a cause of a decrease in image quality or a decrease in frequency responsivity by variations in dot diameter, i.e., a cause of preventing productivity.

SUMMARY OF THE INVENTION

For solving the problems in the prior art, an object of the present invention is to provide an ink composition which realizes image recording having excellent frequency responsivity in the electrostatic inkjet recording by substantially alleviating the ejection delay to avoid variation in dot diameter.

Another object of the present invention is to provide a method for electrostatic inkjet recording using the ink composition.

In order to achieve the above object, according to a first aspect of the present invention, there is provided an ink composition used for inkjet recording, including: a dispersion medium; particles containing at least a colorant; and a charging regulator that generates charges on the particles, wherein an electric conductivity of the particles in the ink composition is saturated.

In the ink composition according to a first aspect of the present invention, it is preferable that the charging regulator comprises a high molecular compound. Ferther, it is preferable that the charging regulator has a carboxylic acid group. Ferther, it is preferable that the charging regulator comprises a high molecular compound obtained by a reaction between a copolymer having at least one kind of monomer soluble in a non-aqueous solvent and maleic anhydride as structural units and one of a primary amino compound and a combination of a primary amino compound and a secondary amino compound, and said high molecular compound having a semi-maleic acid amide component and a maleic imide component as repeating units. Ferther, it is preferable that the ink composition satisfies the following expression:

$$(Cx-C)/C \leq 0.1$$

wherein

A represents the electric conductivity of the ink composition; B represents the electric conductivity of the ink composition after removal of the colorant particles from the ink composition; C represents (A–B); Ax represents the electric conductivity of the ink composition after addition of the charging regulator in an amount of 0.01% by mass to the ink composition; Bx represents the electric conductivity of the ink composition after removal of the colorant particles from the ink composition to which the charging regulator was added in an amount of 0.01% by mass; and Cx represents (Ax–Bx). Ferther, it is preferable that the particles are prepared by coating the colorant with a coating agent. Ferther, it is preferable to include a dispersant for dispersing the particles in the dispersion medium. Ferthermore, it is preferable that the dispersant comprises a polymer having a weight average molecular weight of 1,000 to 1,000,000, and a polydispersity index of 1.0 to 7.0.

Ferther, according to a second aspect of the present invention, there is provided an inkjet recording method, including: acting electrostatic force on an ink composition which contains at least a dispersion medium, particles containing at least a colorant, and a charging regulator that generates charges on the particles and in which an electric conductivity of the particles is saturated; and ejecting an ink droplet of the ink composition.

In the inkjet recording method according to a second aspect of the present invention, it is preferable that a thread of the ink composition is formed by the action of the electrostatic force on the ink composition, and the thread is disrupted to form and eject the ink droplet. Ferther, it is preferable that the ink droplet is ejected on a recording medium by acting the electrostatic force on the ink composition in a state where the recording medium is charged in an opposite polarity to that of the particles. Ferther, it is preferable that the charging regulator of the ink composition comprises a high molecular compound. Ferther, it is preferable that the charging regulator of the ink composition has a carboxylic acid group. Ferther, it is preferable that the charging regulator of the ink composition comprises a high molecular compound obtained by a reaction between a copolymer having as structural units at least one kind of monomer soluble in a non-aqueous solvent and maleic anhydride and one of a primary amino compound and a combination of a primary amino compound and a secondary amino compound, and said high molecular compound having a semi-maleic acid amide component and a maleic imide component as repeating units. Ferther, it is preferable that the ink composition satisfies the following expression:

$$(Cx-C)/C \leq 0.1$$

wherein

A represents the electric conductivity of the ink composition; B represents the electric conductivity of the ink composition after removal of the colorant particles from the ink composition; C represents (A–B); Ax represents the electric conductivity of the ink composition after addition of the charging regulator in an amount of 0.01% by mass to the ink composition; Bx represents the electric conductivity of the ink composition after removal of the colorant particles from the ink composition to which the charging regulator was added in an amount of 0.01% by mass; and Cx represents (Ax–Bx). Ferther, it is preferable that the particles of the ink composition are prepared by coating the colorant with a coating agent. Ferther, it is preferable that the ink composition contains a dispersant for dispersing the particles in the dispersion medium. Ferthermore, it is preferable that the dispersant in the ink composition comprises a polymer having a weight average molecular weight of 1,000 to 1,000,000, and a polydispersity index of 1.0 to 7.0.

According to the ink composition and the inkjet recording method of the present invention, in electrostatic inkjet recording in which an electrostatic field is applied to an ink composition to form a thread made of the ink composition and the tip of the thread is then disrupted to eject an ink droplet, the ejection delay from the application of a driving voltage for ejection to the ejection of a liquid droplet is substantially alleviated to avoid variation in ink dot diameter caused by the ejection delay and a decrease in frequency responsivity, allowing high-quality image recording to be performed with good frequency responsivity.

This application claims priority on Japanese patent application No.2003-311082, the entire contents of which are hereby incorporated by reference.

BRIEF DESCRIPTION OF THE DRAWINGS

FIG. 3A is a schematic diagram for illustrating the inkjet recording method of the present invention;

FIG. 3B is a schematic diagram for illustrating the inkjet recording method of the present invention, which is the continuation of FIG. 3A;

FIG. 3C is a schematic diagram for illustrating the inkjet recording method of the present invention, which is the continuation of FIG. 3B; and FIG. 4 is a schematic diagram for illustrating a conventional electrostatic inkjet recording.

DETAILED DESCRIPTION OF THE INVENTION

Figure 1A:
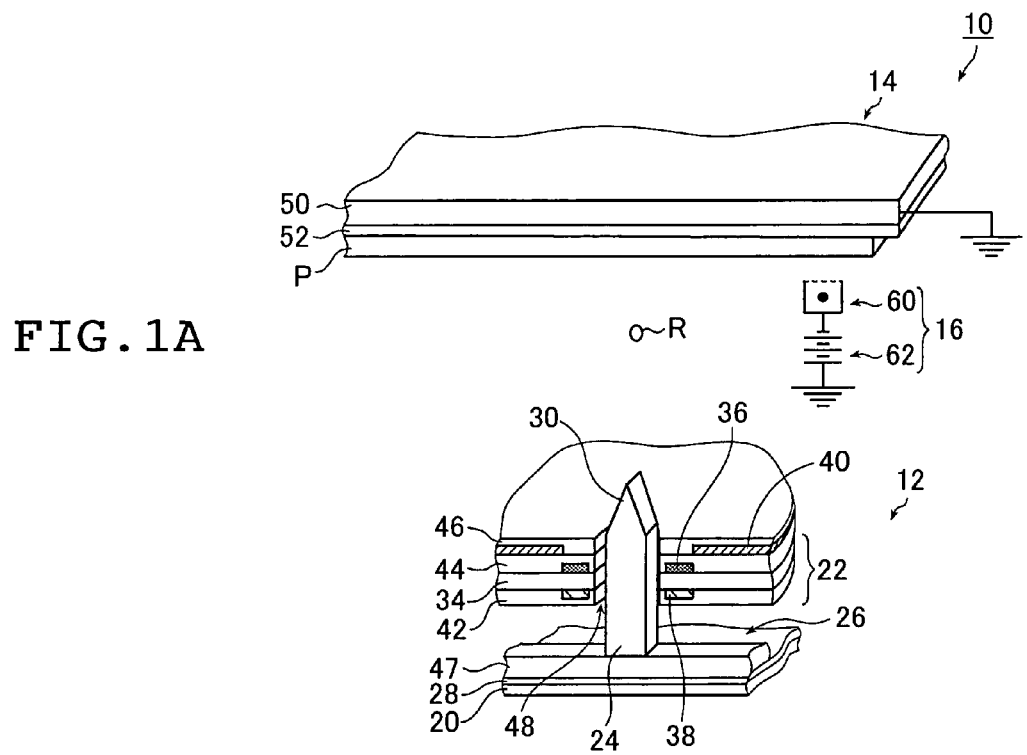
FIG. 1A is a schematic diagram of an example of an inkjet recording apparatus that carries out an inkjet recording method of the present invention.

Hereinafter, the ink composition and the inkjet recording method of the present invention will be described in detail on the basis of preferred embodiments illustrated in the attached drawings.

The ink composition of the present invention has at least a dispersion medium, particles containing at least a colorant (hereinafter, referred to as colorant particles), and a charging regulator for generating electric charges on the colorant particles. The colorant particles (charged particles) from which electric charges are generated by the charging regulator are dispersed in the dispersion medium and the electric conductivity of the colorant particles is saturated. The ink composition of the present invention is not limited as far as it satisfies the above conditions. A preferable example of the ink composition will be described below.

In the ink composition of the present invention, the dispersion medium is preferably a dielectric liquid having a high electric resistivity of particularly $10^{10}$ Ω·cm or more. The use of a dispersion medium having a low electric resistivity is not adequate to the present invention because of electric conduction between the adjoining control electrodes.

Furthermore, the dispersion medium (dielectric liquid) has a dielectric constant of preferably 5 or less, more preferably 4 or less, further preferably 3.5 or less. The dielectric constant of the dispersion medium within the above ranges is preferable because an electric field effectively acts on the charged particles of the dispersion medium.

Preferable examples of the dispersion medium include: linear or branched aliphatic hydrocarbons, alicyclic hydrocarbons, aromatic hydrocarbons, and halogen substitution products of these hydrocarbons; and silicone oil.

For example, hexane, heptane, octane, isooctane, decane, isodecane, decalin, nonane, dodecane, isododecane, cyclohexane, cyclooctane, cyclodecane, toluene, xylene, mesitylene, Isopar C, Isopar E, Isopar G, Isopar H, Isopar L, Isopar M (Isopar: trade name of Exxon Mobil Corporation), Shellsol 70, Shellsol 71 (Shellsol: trade name of Shell-Japan Co.), Amsco 460 solvent (Amsco: trade name of STERIS Corporation), and KF-96L (trade name of Shin-Etsu Chemical Co., Ltd.) may be used singly or as a mixture of two or more.

The dispersion medium content is preferably 20 to 99% by mass of the entire ink composition. A dispersion medium content of 20% by mass or more allows the colorant particles to be favorably dispersed in the dispersion medium. Besides, as far as the dispersion medium content is 99% by mass or less, the content of colorant particles can be satisfied.

In the inkjet composition of the present invention, dyes and pigments, which are well known in the art, can be used as a colorant to be incorporated in the colorant particles and can be selected depending on the purpose and use.

For instance, in terms of color tone of a recorded image-recording product (printed matter), pigments can be preferably used (see, for example, "Stabilization of Pigment Dispersion and Surface Treatment Technology and Evaluation" published by Technical Information Institute Co., Ltd., 1st Printing on Dec. 25, 2001, hereinafter, referred to as a "reference"). More specifically, the use of pigments generally used for offset printing ink or proof is favorable because the same color tone as that of offset printed matter can be obtained.

Further, by altering the colorant to be used in the ink composition of the present invention, ink of four colors (yellow, magenta, cyan, and black), and also other colored ink can be produced.

Examples of the pigment for the yellow ink include: monoazo pigments such as C.I. Pigment Yellow 1 and C.I. Pigment Yellow 74; disazo pigments such as C.I. Pigment Yellow 12 and C.I. Pigment Yellow 17; non benzidine type azo pigments such as C.I. Pigment Yellow 180; azo lake pigments such as C.I. Pigment Yellow 100; condensed azo pigments such as C.I. Pigment Yellow 95; acid dye lake pigments such as C.I. Pigment Yellow 115; basic dye lake pigments such as C.I. Pigment Yellow 18; anthraquinone type pigments such as Flavanthrone Yellow; isoindolinone pigments such as Isoindolinone Yellow 3RLT; quinophthalone pigments such as Quinophthalone Yellow; isoindoline pigments such as Isoindoline Yellow; nitroso pigments such as C.I. Pigment Yellow 153; metal complex salt azo methine pigments such as C.I. Pigment Yellow 117; and isoindolinone pigments such as C.I. Pigment Yellow 139.

Examples of the pigment for the magenta ink include: monoazo pigments such as C.I. Pigment Red 3; disazo pigments such as C.I. Pigment Red 38; azo lake pigments such as C.I. Pigment Red 53:1 and C.I. Pigment Red 57:1; condensed azo pigments such as C.I. Pigment Red 144; acid dye lake pigments such as C.I. Pigment Red 174; basic dye lake pigments such as C.I. Pigment Red 81; anthraquinone type pigments such as C.I. Pigment Red 177; thioindigo pigments such as C.I. Pigment Red 88; perinone pigments such as C.I. Pigment Red 194; perylene pigments such as C.I. Pigment Red 149; quinacridone pigments such as C.I. Pigment Red 122; isoindolinone pigments such as C.I. Pigment Red 180; and alizarin lake pigments such as C.I. Pigment Red 83.

Examples of the pigment for the cyan ink include: disazo pigments such as C.I. Pigment Blue 25; phthalocyanine pigments such as C.I. Pigment Blue 15; acid dye lake pigments such as C.I. Pigment Blue 24; basic dye lake pigments such as C.I. Pigment Blue 1; anthraquinone type pigments such as C.I. Pigment Blue 60; and alkali blue pigments such as C.I. Pigment Blue 18.

Examples of the pigment for the black ink include: organic and iron oxide pigments such as aniline black type pigments; and carbon black pigments such as Furnace Black, Lamp Black, Acetylene Black, and Channel Black.

Further, suitably applicable typical processed pigments include microlith pigments such as Microlith-A, -K, and -T. Specific examples thereof include Microlith Yellow 4G-A, Microlith Red BP-K, Microlith Blue 4G-T, and Microlith Black C-T.

Further, in addition to the ink of yellow, magenta, cyan and black colors, ink such as white ink using calcium carbonate and a titanium oxide pigment, silver ink using aluminum powder, or gold ink using a copper alloy may be used in the ink composition of the present invention.

Basically, it is preferable to use one type of pigment for one color in terms of convenience in ink production. Alternatively, for color tint adjustment, two or more kinds of pigments may be mixed together, for example the mixture of carbon black with phthalocyanine for black ink. In addition, the pigments may be used after surface treatment by a conventional procedure, such as rosin treatment (see the reference mentioned above).

The content of the colorant (preferably pigment) is preferably 0.1 to 50% by mass of the entire ink composition. The content of the colorant of 0.1% by mass or more is sufficient for good color development in printed matter. In addition, the particles containing the colorant can be favorably dispersed in the dispersion medium when the content of the colorant is 50% by mass or less. The content of the colorant is more preferably 1 to 30% by mass of the entire ink composition.

In the ink composition of the present invention, the colorant particles may be prepared by directly dispersing (pulverizing) the colorant such as a pigment in the dispersion medium. Preferably, the colorant particles may be prepared as particles in which the colorant is coated with a coating agent and the particles are then dispersed in the dispersion medium.

Coating the colorant with a coating agent blocks the charges of the colorant itself, so that desirable charging properties can be imparted to the particles. In addition, as the ink composition utilizes the colorant particles having the colorant coated with the coating agent, an image can be more stably fixed by heat fixation with a heat roller or the like after the image has been recorded on a medium (recording medium) by means of electrostatic inkjet recording.

Examples of the coating agent include rosins, rosin modified phenol resin, alkyd resin, (meth)acrylic polymers, polyurethane, polyester, polyamide, polyethylene, polybutadiene, polystyrene, polyvinyl acetate, acetal modified polyvinyl alcohol, and polycarbonate.

Of those, in terms of easiness in particle formation, a preferable polymer has a weight average molecular weight of 2,000 to 1,000,000 and a polydispersity index (weight average molecular weight/number average molecular weight) of 1.0 to 5.0. Furthermore, in terms of easiness in fixation, a preferable polymer has one of a softening point, a glass transition point, and a melting point in the range of 40 to 120° C.

In the present invention, a polymer particularly suitably used as the coating agent is one that contains at least one of the structural units represented by the following general formulas (1) to (4):

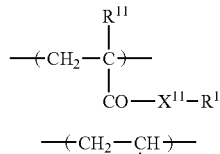

GENERAL FORMULA (1)

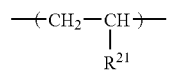

GENERAL FORMULA (2)

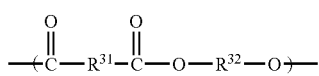

GENERAL FORMULA (3)

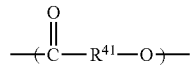

GENERAL FORMULA (4)

In the above formulas, $X^{11}$ represents an oxygen atom or $-N(R^{13})-$; $R^{11}$ represents a hydrogen atom or a methyl group; $R^{12}$ represents a hydrocarbon group having 1 to 30 carbon atoms; $R^{13}$ represents a hydrogen atom or a hydrocarbon group having 1 to 30 carbon atoms; $R^{21}$ represents a hydrogen atom or a hydrocarbon group having 1 to 20 carbon atoms; $R^{31}$, $R^{32}$, and $R^{41}$ each represent a divalent hydrocarbon group having 1 to 20 carbon atoms. Furthermore, the hydrocarbon groups of $R^{12}$, $R^{21}$, $R^{31}$, $R^{32}$, and $R^{41}$ may respectively contain an ether bond, an amino group, a hydroxy group, or a halogen substitutent.

The polymer containing the structural unit represented by the general formula (1) may be obtained by radical polymerization of the corresponding radical polymerizable monomer using any known method.

Examples of the radical polymerizable monomer used include: (meth)acrylates such as methyl (meth)acrylate, ethyl (meth)acrylate, propyl (meth)acrylate, butyl (meth)acrylate, hexyl (meth)acrylate, octyl (meth)acrylate, 2-ethylhexyl (meth)acrylate, dodecyl (meth)acrylate, stearyl (meth)acrylate, cyclohexyl (meth)acrylate, phenyl (meth)acrylate, benzyl (meth)acrylate, and 2-hydroxyethyl (meth)acrylate; and (meth)acrylamides such as N-methyl(meth)acrylamide, N-propyl(meth)acrylamide, N-phenyl(meth)acrylamide, and N,N-dimethyl(meth)acrylamide.

The polymer containing the structural unit represented by the general formula (2) may be obtained by radical polymerization of the corresponding radical polymerizable monomer using any known method.

Examples of the radical polymerizable monomer used include ethylene, propylene, butadiene, styrene, and 4-methylstyrene.

The polymer containing a structural unit represented by the general formula (3) may be obtained by dehydration condensation of the corresponding acid (dicarboxylic acid or acid anhydride) and diol using any known method.

Examples of the dicarboxylic acid and acid anhydride used include succinic anhydride, adipic acid, sebacic acid, isophthalic acid, terephthalic acid, 1,4-phenylene diacetic acid, and diglycolic acid. Further, examples of the diol used include ethylene glycol, 1,2-propanediol, 1,3-propanediol, 1,4-butanediol, 1,6-hexanediol, 1,10-decanediol, 2-butene-1,4-diol, 1,4-cyclohexanediol, 1,4-cyclohexanedimethanol, 1,4-benzenedimethanol, and diethylene glycol.

The polymer that contains the structural unit represented by the general formula (4) can be prepared by dehydration condensation of a carboxylic acid having the corresponding hydroxy group with a known method. Alternatively, the polymer can be prepared by subjecting the cyclic ester of a carboxylic acid having the corresponding hydroxy group to ring-opening polymerization with the known method.

Examples of the carboxylic acid having the corresponding hydroxy group used or the cyclic ester thereof include 6-hydroxyhexanoic acid, 11-hydroxyundecanoic acid, hydroxybenzoic acid, and ε-caprolactone.

The polymer that contains at least one of the structural units represented by the general formulas (1) to (4) may be a homopolymer having the structural unit represented by one of the general formulas (1) to (4) or may be a copolymer with another structural component. Beside, those polymers may be singly used as a coating agent or two or more kinds of the polymers may be used in combination.

The coating agent content is preferably 0.1 to 40% by mass of the entire ink composition. The content of the coating agent of 0.1% by mass or more is sufficient for good fixability. In addition, the colorant particles in which the colorant is coated with the coating agent can be favorably formed when the content of the coating agent is 40% by mass or less.

The ink composition of the present invention is prepared by dispersing (pulverizing) the colorant particles described above in the dispersion medium. In the ink composition of the present invention, it is further preferable to use a dispersant for controlling the particle size of colorant particles and inhibiting the sedimentation of the colorant particles in the composition.

Favorable dispersants include surfactants typified by sorbitan fatty esters such as sorbitan monooleate and polyethylene glycol fatty esters such as polyoxyethylene distearate. In addition, the dispersants also include: a styrene/maleic acid copolymer and an amine-modified product thereof; a styrene/(meta)acrylic compound polymer; a (meta)acrylic polymer; a polyethylene/(meta)acrylic compound polymer; rosin; BYK-160, 162, 164, and 182 (polyurethane polymers manufactured by BYK Chemie Co., Ltd.); EFKA-401 and 402 (acrylic polymers manufactured by EFKA Co., Ltd.); and Solsperse 17000 and 24000 (polyester polymers manufactured by Zeneca Ag Products, Inc.). In the present invention, in terms of long-storage stability of the ink composition, the dispersant is preferably a polymer having a weight average molecular weight of 1,000 to 1,000,000 and a polydispersity index (weight average molecular weight/number average molecular weight) of 1.0 to 7.0. Furthermore, most preferable is to use a graft polymer or a block polymer.

In the ink composition of the present invention, the polymer particularly favorably used as the dispersant is a graft polymer containing at least a polymer component made of at least one of the structural units represented by the general formulas (5) and (6) described below and a polymer component containing at least a structural unit represented by the general formula (7) described below as a graft chain.

GENERAL FORMULA (5)

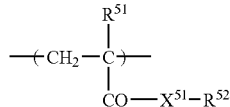

GENERAL FORMULA (6)

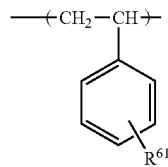

GENERAL FORMULA (7)

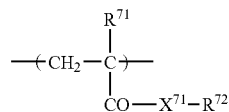

In the above formulas, $X^{51}$ represents an oxygen atom or $-N(R^{53})-$; $R^{51}$ represents a hydrogen atom or a methyl group; $R^{52}$ represents a hydrocarbon group having 1 to 10 carbon atoms; $R^{53}$ represents a hydrogen atom or a hydrocarbon group having 1 to 10 carbon atoms; $R^{61}$ represents a hydrogen atom, a hydrocarbon group having 1 to 20 carbon atoms, a halogen atom, a hydroxyl group, or an alkoxy group having 1 to 20 carbon atoms; $X^{71}$ represents an oxygen atom or $-N(R^{73})-$; $R^{71}$ represents a hydrogen atom or a methyl group; $R^{72}$ represents a hydrocarbon group having 4 to 30 carbon atoms; and $R^{73}$ represents a hydrogen atom or a hydrocarbon group having 1 to 30 carbon atoms. Furthermore, the hydrocarbon groups of $R^{52}$ and $R^{72}$ may respectively contain an ether bond, an amino group, a hydroxy group, or a halogen group.

The above graft polymer can be prepared by: polymerizing radical polymerizable monomers corresponding to the general formula (7); introducing a polymerizable functional group to the end of the obtained polymer; and copolymerizing the polymer with a radical polymerizable monomer corresponding to the general formula (5) or (6). Alternatively, the polymerization of the radical polymerizable monomer corresponding to the general formula (7) is preferably carried out in the presence of a chain transfer agent.

Examples of the radical polymerizable monomer corresponding to the general formula (5) include (meth)acrylates such as methyl (meth)acrylate, ethyl (meth)acrylate, propyl (meth)acrylate, butyl (meth)acrylate, hexyl (meth)acrylate, cyclohexyl (meth)acrylate, phenyl (meth)acrylate, benzyl (meth)acrylate, and 2-hydroxyethyl (meth)acrylate; and (meth)acrylamides such as N-methyl(meth)acrylamide, N-propyl(meth)acrylamide, N-phenyl(meth)acrylamide, and N,N-dimethyl(meth)acrylamide.

Examples of the radical polymerizable monomer corresponding to the general formula (6) include styrene, 4-methylstyrene, chlorostyrene, and methoxystyrene.

Further, examples of the radical polymerizable monomer corresponding to the general formula (7) include hexyl (meth)acrylate, octyl (meth)acrylate, 2-ethylhexyl (meth)acrylate, dodecyl (meth)acrylate, and stearyl (meth)acrylate.

Specific examples of the graft polymer include polymers represented by the following structural formulas.

[BZ-1]

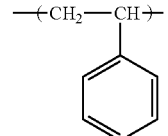

50 wt %

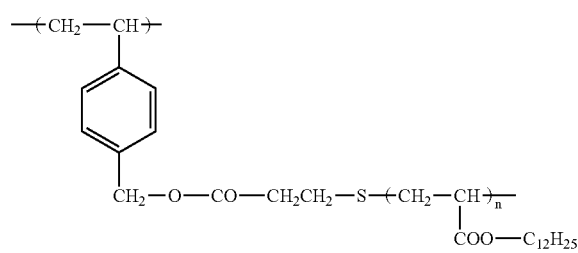

A graft polymer containing a polymer component containing at least one of the structural units represented by the general formulas (5) and (6) and a polymer component containing at least the structural unit represented by the general formula (7) as a graft chain may only contain the structural unit represented by the general formula (5) and/or (6) and the structural unit represented by the general formula (7), or may additionally contain other structural components. A preferable composition ratio between the polymer component containing the graft chain and other polymer components is 10:90 to 90:10. This range is preferable because favorable particle formability can be obtained and a desired particle size can be easily obtained.

Those polymers may be singly used as a dispersant or two or more kinds of the polymers may be used in combination.

The dispersant content is preferably 0.01 to 30% by mass of the entire ink composition. As far as the dispersant content is within the range, favorable particle formability can be obtained and the colorant can have a desired particle size.

By the addition of a charging regulator, the ink composition of the present invention allows the colorant particles dispersed in the dispersion medium to generate electric charges. In the ink composition, the electric conductivity of the colorant particles is saturated. As described above, the colorant particles are dispersed preferably using a dispersant.

Suitable examples of the charging regulator include: metallic salts of organic carboxylic acids such as naphthenic acid zirconium salt and octenoic acid zirconium salt; ammonium salts of organic carboxylic acids such as stearic acid tetramethylammonium salt; metallic salts of organic sulfonic acids such as dodecylbenzenesulfonic acid sodium salt and dioctylsulfosuccinic acid magnesium salt; ammonium salts of organic sulfonic acids such as toluenesulfonic acid tetrabutyl ammonium salt; polymers each containing a carboxylic acid group in the side chain such as a polymer with a carboxylic acid group containing a copolymer of styrene and maleic anhydride modified by amine; polymers each containing a carboxylic acid anion group in the side chain such as a copolymer of stearyl methacrylate and a tetramethylammonium salt of methacrylic acid; polymers each containing a nitrogen atom in the side chain such as a copolymer of styrene and vinylpyridine; and polymers each containing an ammonium group in the side chain such as a copolymer of butyl methacrylate and N-(2-methacryloyloxyethyl)-N,N,N-trimethylammonium tosylate salt.

In the ink composition of the present invention, the charging regulator is preferably a high molecular compound, particularly a high molecular compound that contains a carboxylic acid group.

Of those, one particularly preferable example of the charging regulator is a high molecular compound having a semi-maleic acid amide component and a maleic imide component as repeating units, which is obtained by a reaction between a primary amino compound and a copolymer having at least one or more monomers soluble in a non-aqueous solvent and maleic anhydride as structural units.

In addition, another particularly preferable example of the charging regulator is a high molecular compound having a semi-maleic acid amide component and a maleic imide component as repeating units, which is obtained by a reaction between primary and secondary amino compounds and a copolymer having at least one or more monomers soluble in a non-aqueous solvent and maleic anhydride as structural units.

In the high molecular compound used as the charging regulator, examples of a monomer capable of forming a polymer soluble in a non-aqueous solvent include alkenes, cycloalkenes, styrenes, vinyl ethers, allyl ethers, carboxylic acid vinyl esters, carboxylic acid allyl esters, and esters of unsaturated carboxylic acids such as methacrylic acid and acrylic acid, these being all polymerizable.

To explain further, examples of the monomer include: alkenes each having 3 to 40 carbon atoms in total which may be substituted (for example, propenylene, butene, vinylidene chloride, ω-phenyl-1-propene, allyl alcohol, hexene, octene, 2-ethylhexene, decene, dodecene, tetradecene, hexadecene, octadecene, docosene, eicosene, and hexyl 10-undecanoate); cycloalkenes each having 5 to 40 carbon atoms in total (for example, cyclopentene, cyclohexene, bicyclo[2,2,1]-heptene-2, and 5-cyanobicyclo[2,2,1]-heptene-2); styrenes each having 8 to 40 carbon atoms in total which may be substituted (for example, styrene, 4-methylstyrene, 4-n-octylstyrene, and 4-hexyloxystyrene); vinyl ethers and allyl ethers each having 1 to 40 carbon atoms in total substituted by an aliphatic group (examples of the aliphatic group include: alkyl groups which may be substituted (for example, a methyl group, an ethyl group, a butyl group, a hexyl group, an octyl group, a decyl group, a dodecyl group, a hexadecyl group, an octadecyl group, a docosanyl group, a chloroethyl group, a 2-ethylhexyl group, and a 4-methoxybutyl group); aralkyl groups which may be substituted (for example, a benzyl group and a phenethyl group); cycloalkyl groups which may be substituted (for example, a cyclopentyl group and a cyclohexyl group); and alkenyl groups which may be substituted (for example, a 2-pentenyl group, a 4-propyl-2-pentenyl group, an oleyl group, and a linoleyl group); vinyl ethers and allyl ethers each having 6 to 40 carbon atoms in total substituted by an aromatic group (examples of the aromatic group include: a phenyl group, a 4-butoxyphenyl group, and a 4-octylphenyl group); vinyl esters or allyl esters of an aliphatic carboxylic acid having 2 to 40 carbon atoms in total which may be substituted (for example, esters of acetic acid, valeric acid, caproic acid, capric acid, lauric acid, myristic acid, palmitic acid, stearic acid, oleic acid, sorbic acid, and linoleic acid); vinyl esters or allyl esters of an aromatic carboxylic acid having 6 or more carbon atoms in total (for example, esters of benzoic acid, 4-butylbenzoic acid, 2,4-butylbenzoic acid, and 4-hexyloxybenzoic acid); aliphatic group esters of unsaturated carboxylic acids such as acrylic acid, methacrylic acid, maleic acid, and crotonic acid each having 1 to 32 carbon atoms in total which may be substituted (examples of the aliphatic group include a methyl group, an ethyl group, a propyl group, a hexyl group, a decyl group, a 2-hydroxyethyl group, and an N,N-dimethylaminoethyl group).

For the copolymers having those monomers and maleic anhydride as their structural units, favorable specific examples will be represented by the following formulas (1) to (22). However, the present invention is not limited to those examples.

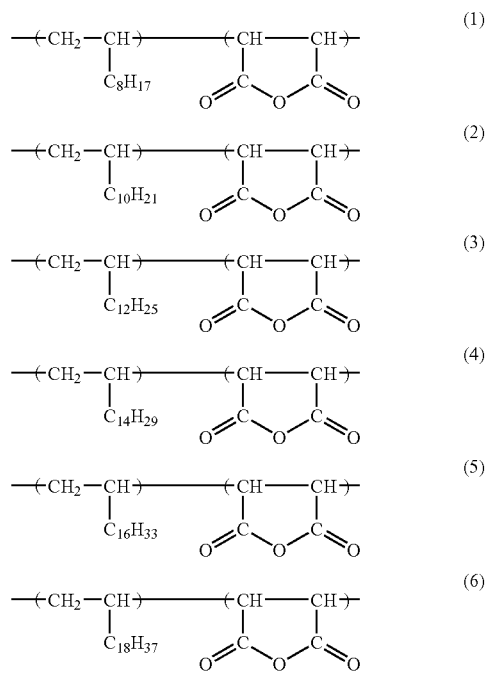

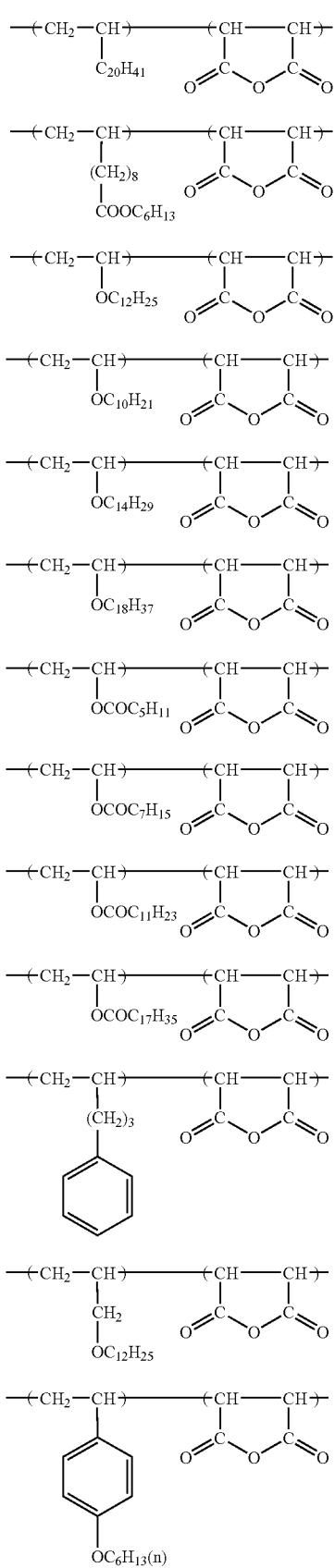
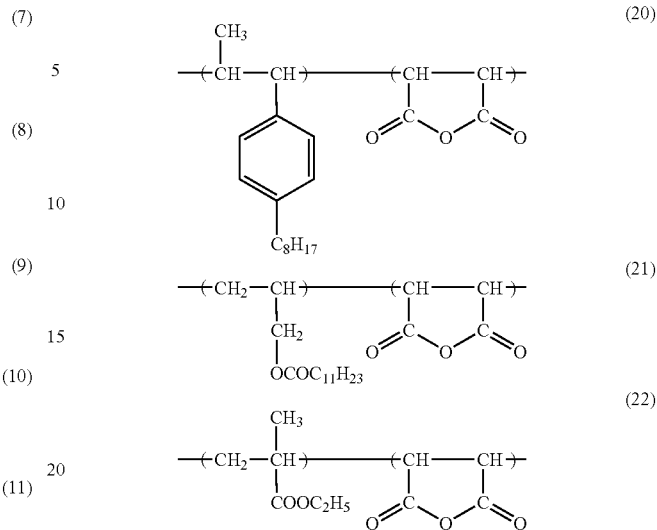

The maleic anhydride-containing copolymer described above can be produced by a conventional known method. For example, the details are described in known publications, such as "Modern Chemical Technology, Volume 16, High-Polymer Industrial Chemistry I(1)", Ryohei Oda Ed., page 281 (published by ASAKURA-SHOTEN, Japan) and those cited in the review in the second chapter of J. Brandrup et al., "Polymer Handbook 2nd, Edition" (published by John Wiley & Sons, N.Y.).

In the ink composition of the present invention, the high molecular compound favorably used as the charging regulator is a reactant between the maleic anhydride-containing copolymer and an amino compound.

The amino compound used is a primary amino compound represented by the following general formula (8) and/or a secondary amino compound represented by the following general formula (9).

$R^{81}NH_2$            General formula (8):

$R^{91}R^{92}NH$           General formula (9):

In the above formulas, $R^{81}$, $R^{91}$, and $R^{92}$ each represent an aliphatic group, an alicyclic hydrocarbon group, an aromatic group, or an heterocyclic group, and in the general formula (9), $R^{91}$ and $R^{92}$ may be identical to or different from each other. Preferable examples thereof include: an alkyl group having 1 to 32 carbon atoms which may be substituted (for example, a methyl group, an ethyl group, a propyl group, a butyl group, a hexyl group, an octyl group, a decyl group, a dodecyl group, a tetradecyl group, a hexadecyl group, an octadecyl group, a docosanyl group, a chloroethyl group, a cyanoethyl group, a 4-butoxypropyl group, a 2-ethylhexyl group, and an N,N-butylaminopropyl group); an alkenyl group having 3 to 32 carbon atoms which may be substituted (for example, an allyl group, a 2-pentenyl group, a 4-propyl-2-pentenyl group, a decenyl group, an oleyl group, and a linoleyl group); an aralkyl group having 7 to 36 carbon atoms which may be substituted (for example, a benzyl group and a phenethyl group); an alicyclic hydrocarbon group having 5 to 32 carbon atoms which may be substituted (for example, a cyclopentyl group, a cyclohexyl group, a bicyclo[2,2,1]-heptyl group, and a cyclohexenyl group); an aryl group having 6 to 38 carbon atoms which may be substituted (for example, a phenyl group, a tolyl group, a 4-butylphenyl group, a 4-decylphenyl group, and a 4-butoxyphenyl group); and a heterocylic group having 5 or more atoms (for example, a furyl group and a thienyl group).

For the general formula (9), the rings of $R^{91}$ and $R^{92}$ may be closed with carbon atoms, or may contain hetero atoms (such as a morpholyl group).

Specific examples of a preferable amino compound include: ethylamine, propylamine, butylamine, pentylamine, hexylamine, octylamine, decylamine, dodecylamine, tetradecylamine, hexadecylamine, stearylamine, docosanylamine, 2-ethylhexylamine, 3,3-dimethylpentylamine, allylamine, hexenylamine, dodecenylamine, tetradecenylamine, hexadecenylamine, octadecenylamine, 2-nonyl-2-butenylamine, allylamine, cyclohexylamine, benzylamine, and 4-n-octylaniline.

The high molecular compound as a reactant between the copolymer having the monomer and maleic anhydride as structural units and the amino compound, which can be preferably used as a charging regulator in the ink composition of the present invention, contains a semi-maleic acid amide component and a maleic imide component.

Such a high molecular compound can be easily produced by: making a semi-maleic acid amide copolymer by a polymer reaction between maleic anhydride in a high molecular compound and a primary amino compound; and carrying out a dehydration ring-closing reaction to convert a part of the semi-maleic acid amide component into a maleic imide component.

More specifically, the respective compounds are mixed in an organic solvent in which the maleic anhydride and the amino compound can be dissolved at a reaction temperature described below without causing the reaction between the maleic anhydride and the amino compound. Examples of the organic solvent include: hydrocarbons such as decane; Isopar G, Isopar H, Shellsol 71, cyclohexane, benzene, toluene, and xylene; ketones such as methylethyl ketone and methylisobutyl ketone; ethers such as dioxane, tetrahydrofuran, and anisole; halogenated hydrocarbons such as chloroform, dichloroethylene, and methyl chloroform; dimethyl formamide; and dimethyl sulfoxide, which can be used singly or in combination.

The reaction mixture is reacted at 60 to 200° C., preferably at 100 to 180° C. for 1 to 80 hours, preferably for 3 to 15 hours. The reaction can be accelerated by using a catalytic amount of an organic base (such as triethyl amine, dimethyl aniline, pyridine, or morpholine), or inorganic or organic acid (such as sulfuric acid, methanesulfonic acid, or benzenesulfonic acid). Alternatively, any typical dehydrating agent (such as phosphorus pentaoxide or dicyclocarboxydiimide) may be used together.

A reactant obtained by the reaction is a high molecular compound that contains a semi-maleic acid amide structure and a maleic amide structure in the high molecular compound as described above. The contents of the semi-maleic acid amide structure and the maleic amide structure are 10:90 to 90:10, preferably 30:70 to 70:30 in weight ratio. The contents of a monomer moiety capable of forming a high molecular compound, which is soluble in a non-aqueous solvent, and a maleic anhydride moiety are 10:90 to 99.5:0.5, preferably 70:30 to 30:70 in weight ratio. The high molecular compound has a molecular weight of 1,000 to 500,000, preferably 5,000 to 50,000.

In the ink composition of the present invention, the electric charges provided from the charging regulator to the colorant particles may be of positive or negative.

In addition, in the ink composition of the present invention, the content of the charging regulator is not particularly limited as far as the amount of the charging regulator added is enough to saturate the electric conductivity of the colorant particles in the ink composition. However, the content of the charging regulator is preferably in the range of 0.0001 to 10% by mass of the entire ink composition.

Furthermore, in addition to the above components including the dispersion medium, colorant particles, dispersant, and charging regulator, the ink composition of the present invention may contain various additional components for any purpose, such as an antiseptic for preventing putrefaction and a surfactant for controlling surface tension.

As described above, the ink composition of the present invention contains the colorant particles dispersed in the dispersion medium and the charging regulator for generating electric charges on the colorant particles, where the electric conductivity of the colorant particles in the ink composition is saturated. In other words, the amount of the charging regulator enough to saturate the electric conductivity of the colorant particles is added to the ink composition.

As described above (more concretely described below), in the electrostatic inkjet recording, the ink composition forms the Taylor cone in the shape of a circular cone when a driving voltage for ejecting an ink droplet is applied (ejection ON). Subsequently, an elongated tubular thread is formed and grown. During the application of the driving voltage, the tip of the thread becomes successively disrupted to eject ink droplets.

In other words, the so-called ejection delay occurs because of the need of time from the start of the application of the driving voltage to the ejection of ink droplets by disrupting the thread.

If the ejection delay is long, a droplet-ejecting time within the time period of applying a driving voltage once (pulse voltage) corresponding to a dot (within the time of ejection ON) becomes unstable. That is, the amount of a droplet ejected becomes unstable. As a result, variations in diameters of dots on the recording medium P occur.

In addition, if the ejection delay is long, a droplet-ejecting time within the time period of applying a driving voltage once becomes short. That is, the amount of an ink droplet ejected per dot becomes small. In the electrostatic inkjet recording, for recording an image with high density, that is, a shadow region, there is a need of ensuring a sufficient time for ejecting an ink droplet per dot, so that the time period of applying a driving voltage once should be prolonged. Therefore, there is a need of lowering the driving frequency (the frequency at which a driving voltage is applied), and thus frequency responsivity deteriorates.

The inventor of the present invention has devoted himself to studying the ejection delay in the electrostatic inkjet recording and finally found that the ejection delay is affected by the characteristic features of the ink composition, and in particular is largely affected by the electric conductivity of the colorant particles. Furthermore, the inventor has found that the ejection delay can be largely alleviated by saturating the electric conductivity of the colorant particles in the ink composition.

As described later, in the electrostatic inkjet recording, electrophoresis or the like with a bias voltage allows the movement of charged colorant particles so that the ink in the ejecting portion (nozzle) is concentrated. In addition, the application of a driving voltage causes the formation, growth, and disruption of the thread. According to the ink composition of the present invention, the electric conductivity of the colorant particles is saturated in the ink composition. After the application of the driving voltage, such steps of the thread formation to the thread disruption can be quickly caused. In other words, the ejection delay can be extensively alleviated. Therefore, the electrostatic inkjet recording allows the stable drawing of an image without variation in dot diameter caused by the ejection delay and realizes good frequency responsivity, allowing the drawing of an image with high image quality.

In the present invention, the phrase "the colorant particles are saturated in the ink composition" means the status in which electric charges occur not on the colorant particles but in the dispersion medium even though an additional amount of the charging regulator is added to the ink composition. Preferably, the following mathematical expression will be satisfied.

$$(Cx-C)/C \leq 0.1$$

In the expression: C represents (A−B) where A represents the electric conductivity of the ink composition and B represents the electric conductivity of the ink composition after removal of the colorant particles from the composition; Cx represents (Ax−Bx) where Ax represents the electric conductivity of the ink composition after addition of the charging regulator in an amount of 0.01% by mass to the ink composition and Bx represents the electric conductivity after removal of the colorant particles from the ink composition added with the charging regulator in an amount of 0.01% by mass. That is, C is the electric conductivity of the colorant particles, and Cx is the electric conductivity of the colorant particles after addition of the charging regulator in an amount of 0.01% by mass to the ink composition.

If the ink composition satisfies the above expression, it is decided that the electric conductivity of the colorant particles is sufficiently saturated in the ink composition. Therefore, a decrease in the above ejection delay and high-quality image formation can be more favorably realized.

Preferably, satisfying "$(Cx-C)/C \leq 0.05$" further reduces the ejection delay to equalize the diameters of the dots and realizes enhanced frequency responsivity to draw an image with high image quality.

Furthermore, in the present invention, the electric conductivity of the ink composition may be determined under the conditions in which, for example, an LCR meter (e.g., AG4311 manufactured by Ando Electric Co., Ltd.) and a liquid electrode (e.g., LP-05 type, manufactured by Kawaguchi Electric Works Co., Ltd.) are used at 20° C. in temperature of the ink composition, 5V in applied voltage, and 1 kHz in frequency.

In addition, removal of colorant particles from the ink composition may be carried out by using, for example, a high-speed cooling centrifuge (e.g., SRX-201 manufactured by TOMY SEIKO CO.,LTD.) to centrifuge colorant particles for 30 minutes under the conditions of 14,500 rpm in rotational speed and 20° C. in temperature before separation. For example, the electric conductivity (B and Bx) of the ink composition after removal of the colorant particles can be determined by measuring the electric conductivity of a supernatant after centrifugal sedimentation.

The electric conductivity of the ink composition of the present invention is preferably in the range of, but not specifically limited to, 10 to 300 nS/m. The ejection of an ink droplet can be stabilized by making the electric conductivity of the ink composition 10 nS/m or more. In addition, when the ink composition has an electric conductivity of 300 nS/m or less, the electrical conduction in nozzles (ejecting portion) of the inkjet head can be prevented, so that the damage of the head can be prevented. The electric conductivity of the ink composition is more preferably in the range of 30 to 200 nS/m.

Furthermore, the charging amount of the colorant particles is preferably 5 to 200 μC/g. The concentration of ink at the time of ejection described below can be sufficiently performed when the charging amount of the colorant particles is 5 μC/g or more. In addition, when the charging amount of the colorant particles is 200 μC/g or less, excess ink concentration can be avoided to prevent clogging of the nozzles in the inkjet head. The charging amount of colorant particles is more preferably 10 to 150 μmC/g, still more preferably 15 to 100 μmC/g.

In the ink composition of the present invention, the particle size of the colorant particles is preferably represented by, but not specifically limited to, a volume average diameter of 0.2 to 5.0 μm. The concentration of ink at the time of ejection can be sufficiently performed when the volume average diameter of the colorant particles is 0.2 μm or more. In addition, nozzle-clogging of the inkjet head can be favorably prevented when the volume average diameter of the colorant particles is 0.5 μm or less. The particle size of the colorant particles is more preferably 0.3 to 3.0 μm. In addition, the particle size distribution is preferably narrow and uniform.

Furthermore, the volume average diameter of colorant particles can be determined, for example, by centrifugal sedimentation using an apparatus such as an ultracentrifuge-type automatic particle size distribution measuring device CAPA-700 (manufactured by Horiba, Ltd.).

The viscosity of the ink composition of the present invention is preferably, but not specifically limited to, 0.5 to 5 mPa·s. Dripping of the ink composition from the nozzle of the inkjet head can be favorably prevented when the viscosity of the ink composition is 0.5 mPa·s or more. In addition, the stability of ejection of an ink droplet can be ensured when the viscosity of the ink composition is 5 mPa·s or less. The viscosity of the ink composition is more preferably 0.8 to 4 mPa·s.

Furthermore, the surface tension of the ink composition of the present invention is not specifically limited but preferably 10 to 70 mN/m. Dripping of the ink composition from the nozzle of the inkjet head can be favorably prevented when the surface tension of the ink composition is 10 mN/m or more. The stability of ejection of an ink droplet can be ensured when the surface tension of the ink composition is 70 mN/m or less. The surface tension of the ink composition is more preferably 15to 50 mN/m.

The ink composition of the present invention can be prepared by: dispersing and pulverizing colorant particles in a dispersion medium; and adding a charging regulator to the dispersion medium at a concentration enough to saturate the electric conductivity of the colorant particles. Specific methods include:

(1) a method involving: mixing (kneading) a colorant and a coating agent in advance; dispersing the mixture in a dispersion medium with a dispersant; and adding a charging regulator to the mixture;

(2) a method involving: simultaneously mixing and dispersing a colorant, a coating agent, and a dispersant together; and adding a charging regulator to the mixture; and (3) a method involving simultaneously adding and dispersing a colorant, a coating agent, a dispersant and a charging regulator to a dispersion medium.

Furthermore, devices used for mixing and dispersion include a kneader, a dissolver, a mixer, a high-speed disperser, a sand mill, a roll mill, a ball mill, an attritor, and a bead mill (see the reference mentioned above).

In the inkjet recording method of the present invention, ink droplets are ejected by means of the electrostatic inkjet recording using the ink composition of the present invention to thereby form an image. Preferably, by applying the electrostatic force to the ink composition, a thread (elongated column made of the ink composition) is formed and the tip of the thread is successively disrupted to eject liquid droplets.

Figure 1B:
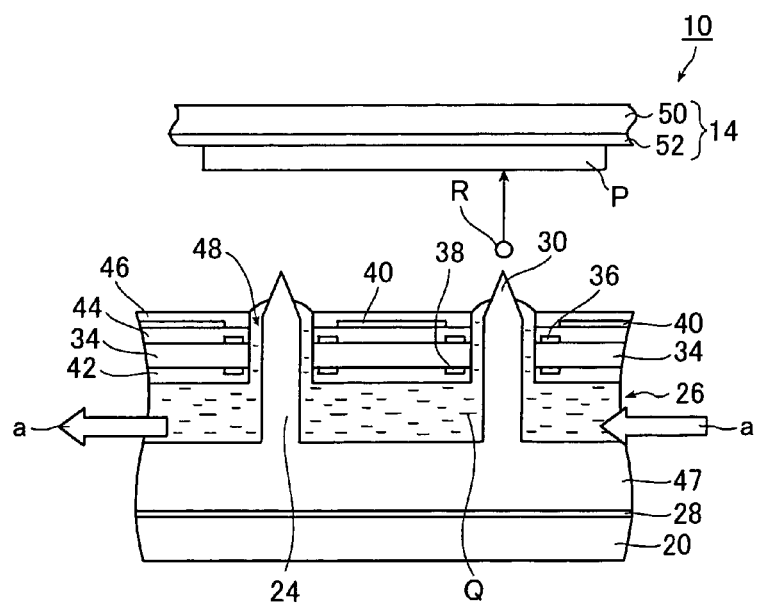
FIG. 1B is a schematic diagram of the inkjet recording apparatus shown in FIG. 1A as seen from another direction.

FIGS. 1A and 1B schematically show an example of an electrostatic inkjet recording apparatus that carries out the inkjet recording method of the present invention. In addition, FIG. 1A is a perspective diagram showing the inkjet recording apparatus in partial section and FIG. 1B is a partial cross-sectional diagram.

For facilitating the description, FIG. 1A shows only one ejecting portion of an inkjet head having a multi-channel structure in which a plurality of ejecting portions are arranged in a two dimensional array as shown in FIGS. 2A, 2B and 2C, and FIG. 1B represents two ejecting portions.

An inkjet recording apparatus 10 (hereinafter, referred to as recording apparatus 10) shown in FIGS. 1A and 1B includes an inkjet head 12 (hereinafter, referred to as head 12), a holding means 14 for a recording medium P, and a charging unit 16. In the recording apparatus 10, the charging unit 16 provides the recording medium P with a bias potential, and then, in a state in which the head 12 faces the recording medium P, the head 12 and the holding means 14 are allowed to move relatively. In the meantime, each ejecting portion of the head 12 is driven with modulation to switch the ejection on/off depending on an image to be recorded such that an ink droplet R is ejected on demand to form a desired image on the recording medium P.

Figure 2A:
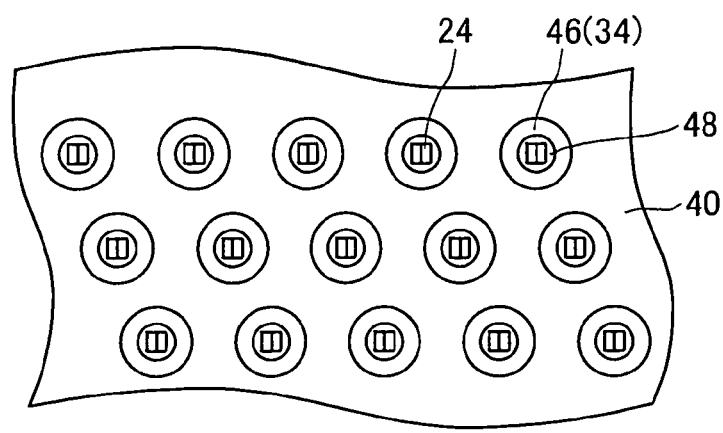
FIG. 2A is a schematic diagram for illustrating a guard electrode of the inkjet recording apparatus shown in FIG. 1A.
Figure 2B:
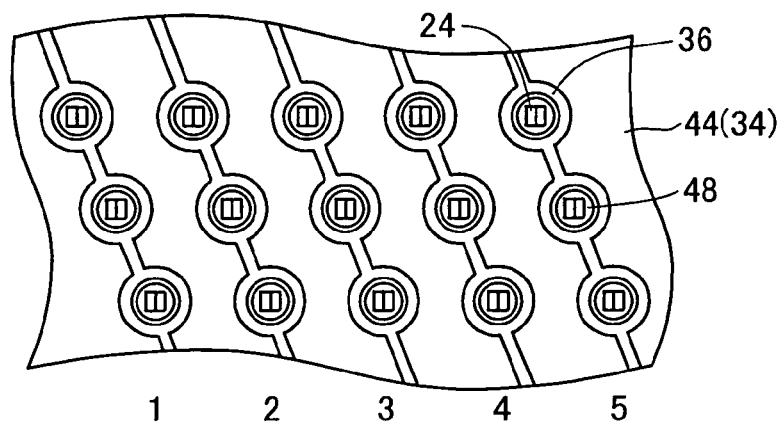
FIG. 2B is a schematic diagram for illustrating a first control electrode of the inkjet recording apparatus shown in FIG. 1A.
Figure 2C:
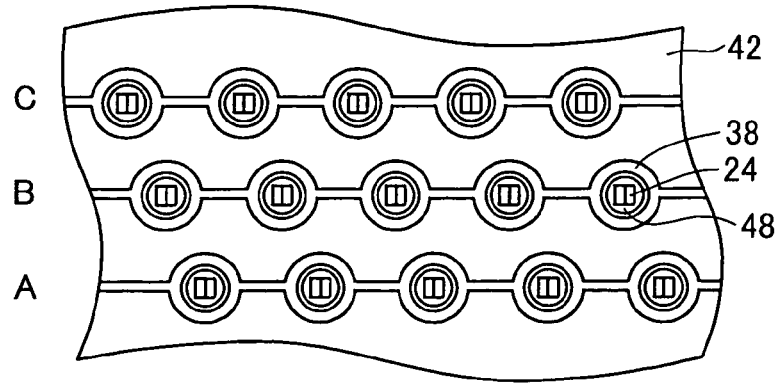
FIG. 2C is a schematic diagram for illustrating a second control electrode of the inkjet recording apparatus shown in FIG. 1A.

Furthermore, as schematically shown in FIGS. 2A, 2B and 2C, the head 12 is an inkjet head having a multi-channel structure in which a number of ejecting portions are two-dimensionally arranged. In FIGS. 1A and 1B, for clearly illustrating the structure of the ejecting portion, a part of the ejecting portions is only shown.

The head 12 is an electrostatic inkjet head that ejects the ink droplet R by applying electrostatic force to the ink composition of the present invention represented by symbol Q (hereinafter, referred to as ink Q). The head 12 is provided with a head substrate 20, a nozzle substrate 22, and an ink guide 24.

In addition, the head substrate 20 and the nozzle substrate 22 are arranged face-to-face at a predetermined distance from each other. An ink flow path 26 is formed between those substrates 20 and 22 to supply the ink Q to each ejection orifice. The ink Q contains colorant particles (charged particles) which are charged in the same polarity as that of a control voltage to be applied to a first control electrode 36 and a second control electrode 38. At the time of recording, the ink Q circulates through the ink flow path 26 along a predetermined direction at a predetermined speed (e.g., an ink flow of 200 mm/s).

The head substrate 20 is a sheet-like insulating substrate, which is common to all ejecting portions. Formed on the surface of the head substrate 20 is a floating conducting plate 28 in an electrically floating state.

On the floating conducting plate 28, an inductive voltage is generated at the time of image recording. The inductive voltage is induced depending on the voltage level of the control voltage applied to the control electrode of the ejecting portion described later. In addition, the voltage level of the inductive voltage automatically changes depending on the number of operating channels. The inductive voltage facilitates the movement of the colorant particles in the ink Q in the ink flow path 26 toward the nozzle substrate 22. In other words, the concentration of the ink Q in the nozzle 48 described below is performed more advantageously.

By the way, the floating conducting plate 28 is not an essential component, so that it is preferable to provide the plate if required. In addition, the floating conducting plate 28 may be arranged such that it is on the side of the head substrate 20 with respect to the ink flow path 26. For instance, the plate may be arranged inside the head substrate 20. Furthermore, the floating conducting plate 28 is preferably arranged upstream of the ink flow path 26 from the position in which the ejecting portion is arranged. Alternatively, a predetermined voltage may be applied to the floating conducting plate 28.

On the other hand, the nozzle substrate 22 is a sheet-like insulating substrate common to all of the ejecting portions just as in the case of the head substrate 20. The nozzle substrate 22 is provided with an insulating substrate 34, the first control electrode 36, the second control electrode 38, a guard electrode 40, and insulating layers 42, 44, and 46. In addition, nozzles 48, which are used as the ejection orifices of ink, are opened at the positions corresponding to the respective ink guides 24 and extend through the nozzle substrate 22.

As described above, the head substrate 20 and the nozzle substrate 22 are arranged at a distance from each other and the ink flow path 26 is formed between them.

The first electrodes 36 and the second electrodes 38 are circular electrodes provided on the top and bottom surfaces of the insulating substrate 34 in FIGS. 1A and 1B, respectively, and these electrodes are formed in a ring shape so as to surround the nozzles 48 corresponding to the respective ejecting portions. The surfaces of the insulating substrate 34 and the first control electrodes 36 are coated with the insulating layer 44 that protects and flattens the surfaces. Likewise, the surfaces of the insulating substrate 34 and the second control electrodes 38 are coated with the insulating layer 42 that flattens the surfaces.

The first control electrodes 36 and the second control electrodes 38 are not limited to ring-shaped circular electrodes. Any shaped electrode, such as a generally circular electrode, a divided circular electrode, a parallel electrode, or a generally parallel electrode, may be used as far as the electrode can be arranged so as to face the ink guide 24.

As shown in FIG. 2A, in the head 12, the ejecting portions, each of which includes the ink guide 24, the first control electrode 36, the second control electrode 38 and the nozzle 48, are arranged in a two-dimensional matrix.

As shown in FIG. 2C, the head 12 includes three rows (row A, row B, and row C) of ejecting portions arranged in the column direction (main-scanning direction). In FIGS. 2A, 2B and 2C, five ejecting portions are arranged in the row direction (sub-scanning direction) (i.e., 1st column, 2nd column, 3rd column, 4th column, and 5th column) so that a total of 15 ejecting portions are arranged in a matrix.

As shown in FIG. 2B, the first control electrodes 36 of the respective ejecting portions arranged in the same column are connected with each other. In addition, as shown in FIG. 2C, the second control electrodes 38 of the respective ejecting portions arranged in the same row are connected with each other.

Although not shown in FIGS. 2A to 2C, the first control electrodes 36 and the second control electrodes 38 are connected to a pulse power supply for applying a driving voltage (pulse voltage) to each of the electrodes. Thus, each electrode is driven with modification to switch on/off for the ejection of the ink droplet R.

The ejecting portions in each row are arranged at a predetermined distance from each other in the row direction.

In addition, the ejecting portions on the row B have predetermined intervals in the column direction with respect to the ejecting portions on the row A and are arranged between the ejecting portions on the row A and the ejecting portions on the row C in the row direction. Likewise, the ejecting portions on the row C are arranged at predetermined intervals in the column direction with respect to five ejecting portions on the row B, and also arranged between the ejecting portions on the row B and the ejecting portions on the row A in the row direction.

Accordingly, the ejecting portions included in the respective rows A, B, and C are arranged so as to be displaced in the row direction. Therefore, one row recorded on the recording medium P is divided into three groups in the row direction.

At the time of image recording, the first control electrodes 36 arranged on the same column are concurrently driven with the same voltage level. Likewise, five second control electrodes 38 arranged on the same row are concurrently driven with the same voltage level.

Furthermore, a row recorded on the recording medium P is divided into three groups corresponding to the number of rows of the second electrodes 38 in the row direction and sequentially recorded in a time-shared manner. For instance, in the case of one shown in FIGS. 2A–2C, the rows A, B, and C of the second control electrodes 38 are sequentially recorded at predetermined timings, so that an image for one row is recorded on the recording medium P. In response to this recording, furthermore, the first control electrodes 36 are driven with modulation (ejection on/off) depending on image data (image to be recorded) to eject the ink droplet R to record an image.

Therefore, in the illustrated example, image recording is performed while the recording medium P and the head 12 are relatively moved in the column direction (main-scanning direction). Therefore, image recording with a recording density of three times as high as the recording density of each row can be performed in the row direction (sub-scanning direction).

By the way, the structure of the control electrode is not limited to the two-layer electrode structure of the first and second electrodes 36, 38. The control electrode may be of a single layer electrode structure or an electrode structure of three or more layers.

The guard electrode 40 is a sheet-like electrode common to all of the ejecting portions. As shown in FIG. 2A, the guard electrode 40 has a ring-shaped opening formed in the area corresponding to the first control electrode 36 and second control electrode 38 formed around the nozzle 48 of each ejecting portion. In addition, the surfaces of the insulating layer 44 and the guard electrode 40 are coated with the insulating layer 46 for protecting and flattening the surfaces. A predetermined voltage is applied to the guard electrode 40 to prevent electric-field interference between the ink guides 24 of the adjacent ejecting portions.

By the way, the guard electrode 40 is not an essential component. In addition, for preventing a repulsive electric field in the direction from the first control electrode 36 or the second control electrode 38 to the ink flow path 26, the nozzle substrate 22 may be provided with a shield electrode on the side of the ink flow path 26 with respect to the second electrode 38.

The ink guide 24 is a ceramic plate of a predetermined thickness having a convex tip portion 30. In the illustrated example, the ink guides 24 of the respective ejecting portions on the same row are arranged at predetermined intervals on the same support 47 mounted on the floating conducting plate 28 on the head substrate 20. The ink guide 24 passes through the nozzle 48 formed in the nozzle substrate 22 and the tip portion 30 of the ink guide 24 protrudes over the outermost surface of the nozzle substrate 22 toward the recording medium P (the upper surface of the insulating layer 46 in FIG. 1B).

The tip portion 30 of the ink guide 24 formed is in a generally triangle (or trapezoidal) shape so that the tip portion gradually narrows toward the means 14 for holding a recording medium P.

Furthermore, it is preferable that metal be vapor-deposited on the tip portion 30 (the leading edge portion). Even though the metal deposition on the tip portion 30 is not an essential factor, the deposition has an effect of a substantial increase in dielectric constant of the tip portion 30, thus easily causing a strong electric field.

The shape of the ink guide 24 is not specifically limited as far as the shape allows the colorant particles in the ink Q to migrate toward the tip portion 30 (i.e., concentration of the ink Q). For instance, the tip portion 30 may be freely modified, such as one having no convex tip portion. Besides, for accelerating the concentration of the ink, a cutout portion provided as an ink-guiding groove for collecting the ink Q in the tip portion 30 by means of a capillary phenomenon may be formed along the middle portion of the ink guide 24 in the vertical direction in FIG. 1B.

Such a head 12 may be the so-called line head having columns of ejecting portions corresponding to the whole area of one side of the recording medium P. Alternatively, the head may be the so-called shuttle type head with a combination of the scanning movement of the head 12 and the intermittent transport of the recording medium P.

The means 14 for holding the recording medium P is provided with an electrode substrate 50 and an insulating sheet 52 and is spaced apart from the tip portion 30 of the ink guide 24 by a predetermined distance (e.g., 200 to 1,000 μm) to be opposed to the head 12.

The electrode substrate 50 is grounded, while the insulating sheet 52 is placed on the surface of the electrode substrate 50 facing to the ink guide 24. At the time of recording, the recording medium P is held on the surface of the insulating sheet 52. That is, the holding means 14 (insulating sheet 52) acts as a platen for the recording medium P.

The charging unit 16 includes a scorotron charging device 60 for charging the recording medium P to a negative high voltage and a bias voltgae supply 62 for supplying a negative high voltage to the scorotron charging device 60.

The scorotron charging device 60 is arranged at a position facing to the surface of the recording medium P, while keeping a predetermined distance from the recording medium P. In addition, the negative terminal of the bias voltage supply 62 is connected to the scorotron charging device 60 and the positive terminal of the bias voltage supply 62 is grounded.

A charging means of the charging unit 16 is not limited to the scorotron charging device 60. Any of various charging means well known in the art, such as a corotron charging device and a solid charger, may be used.

At the time of image recording, the charging unit 16 charges the surface of the insulating sheet 52, i.e., the recording medium P to a predetermined negative high voltage (e.g., −1,500 V) having an opposite polarity to that of the high voltage to be applied to the first control electrode 36 and the second control electrode 38. Consequently, the recording medium P is biased to a negative high voltage with respect to the first control electrode 36 or the second control electrode 38, while being electrostatically adsorbed onto the insulating sheet 52 of the holding means 14.

In other words, in the recording apparatus 10 of the illustrated example, the recording medium P acts as an opposing electrode in the electrostatic inkjet recording.

In the illustrated example, the electrostatic adsorption of the recording medium P onto the surface of the insulating sheet 52 is attained by: forming the holding means 14 from the electrode substrate 50 and the insulating sheet 52; and charging the recording medium P to a negative high voltage by the charging unit 16. However, the recording apparatus 10 for carrying out the present invention is not limited to such a configuration. The holding means 14 may be formed only from the electrode substrate 50 and the holding means (electrode substrate 50 itself) 14 may be connected to the bias voltage supply 62 so as to be always biased to a negative high voltage so that the recording medium P can be electrostatically adsorbed onto the surface of the opposing electrode.

Furthermore, the electrostatic adsorption of the recording medium P onto the holding means 14 and the application of a negative bias high voltage to the recording medium P or the application of a negative bias high voltage to the holding means 14 may be independently performed using different supplies of negative high voltages. The method for the support of the recording medium P by the holding means 14 is not limited to the electrostatic adsorption of the recording medium P, and any other supporting methods or means may be used.

The mechanism of ejecting the ink droplet R in the recording apparatus 10 will be described below to detail the electrostatic inkjet recording method of the present invention.

In the following examples, colorant particles are positively charged. For ejecting the ink droplet R, positive voltages are applied to both the first and second control electrodes 36, 38, while the recording medium P is charged to a negative bias voltage.

At the time of image recording, the ink Q circulates at a predetermined speed from the right side to the left side in FIG. 1B (i.e., in the direction of the arrow "a" in FIGS. 1B) through the ink flow path 26 by means of an ink circulating mechanism (not shown).

On the other hand, the recording medium P is charged to a negative high potential (e.g., −1,500 V) by the charging unit 16, so that the recording medium P is transported at a predetermined speed to the deeper side of FIG. 1A by transport means (not shown) while being electrostatically adsorbed onto the insulating sheet 52 of the holding means 14. In other words, the recording medium P is an opposing electrode charged to a bias voltage of −1,500 V.

In the state where the bias voltage is only applied to the recording medium P, Coulomb attraction between the bias voltage and the charge of colorant particles (charged particles) in the ink Q, Coulomb repulsion between the colorant particles, the viscosity, surface tension, and dielectric polarization force of the carrier fluid, and so on act on the ink Q and are coupled together to move the colorant particles and carrier fluid, and they are balanced in the form of meniscus as schematically shown in FIG. 3A in which the ink Q rises a little from the nozzle 48.

In addition, those factors including the Coulomb attraction allow the colorant particles to electrophoretically migrate to the recording medium P being charged to a bias voltage. In other words, the ink Q is concentrated at the meniscus of the nozzle 48.

From this state, a driving voltage for ejecting the ink droplet R is applied. That is, in the illustrated example, driving voltages of about 400 to 600 V (pulse voltages) are applied to the first control electrode 36 and the second control electrode 38 from their corresponding pulse supplies (ejection ON).

Consequently, the driving voltage is superimposed on the bias voltage, so that an additional movement coupled with the superimposed driving voltage occurs in the previous coupling. Thus, the colorant particles and the carrier fluid are pulled to the bias voltage (opposing electrode) side, that is, the side of the recording medium P by electrostatic force. As a result, as schematically shown in FIG. 3B, meniscus grows and the so-called Taylor cone, which is a generally conical ink liquid column, is then formed from the upper portion of the meniscus. In addition, similar to the above description, the colorant particles are electrophoretically migrated to the meniscus and thus the ink Q in meniscus is concentrated, resulting in an almost uniform and high-concentrated state with a large number of colorant particles.

When a limited time passes after the start of the application of the driving voltage, migration of colorant particles, and so on lead to disruption of a balance of the surface tension mainly between the colorant particles and the carrier fluid at the tip portion of the meniscus having a high electric field strength. As a result, as schematically shown in FIG. 3C, the meniscus grows rapidly and forms an elongated ink liquid column of several to several tens of micrometers in diameter, which is called a thread.

When an additional limited time passes, the thread grows up and then the thread becomes disrupted because of interactions among the growth of the thread, vibration caused by the Rayleigh/Weber instability, uneven distribution of colorant particles in the meniscus, and uneven distribution of an electrostatic field applied to the meniscus. As the thread is disrupted, the ink Q is ejected in the form of the ink droplet R. The ink droplet R flies, while it is pulled by a bias voltage, and lands on the recording medium P.

The growth and disruption of the thread and the movement of colorant particles to the meniscus (thread) are continuously generated during the application of the driving voltage. In addition, after the completion of the application of the driving voltage (ejection OFF), the state returns to the state of meniscus shown in FIG. 3A, where only the bias voltage is applied.

As described above, according to the electrostatic inkjet recording, a dot corresponding to one application (ejection ON) of a driving voltage (pulse voltage) is formed by a plurality of fine ink droplets caused by disrupting the thread. Therefore, the duration of one-time application of a driving voltage (so-called pulse width) is made variable. Thus, the control of the duration makes it possible to adjust the amount (number) of fine liquid droplets ejected during one-time application of the driving voltage, or ejected for the formation of one dot, whereby an improvement in uniformity of dot diameter on the recording medium P and the recording of an image with enhanced gradation by density-gradation control using the dot diameter adjustment can be attained.

In contrast, the typical electrostatic inkjet recording takes a long time from the start of driving-voltage application to the ejection of the ink droplet R by disrupting the thread. In other words, the ejection delay occurs. As a result, variations in dot diameter occur and favorable frequency responsivity is hardly obtained as described above.

On the other hand, the inkjet recording method of the present invention using the ink composition of the present invention, in which the electric conductivity of colorant particles is saturated, substantially alleviates ejection delay to avoid variations in dot diameter caused by the ejection delay, so that the image-drawing with stable dots can be performed. Besides, good frequency responsivity can be realized, so that high-quality image drawing can be performed by the electrostatic inkjet recording.

As described above, the head 12 of the illustrated example has the first control electrodes 36 and the second control electrodes 38. If driving voltages are applied to both the electrodes (i.e., both electrodes are being driven (ON)), the formation of the Taylor cone and thread and the disruption of the thread occur and the ink droplet R is then ejected from the nozzle 48.

Furthermore, as described above, the second control electrodes 38 are sequentially actuated line by line at predetermined timings so as to be brought into high voltage levels (e.g., 400 to 600 V) or high impedance states (ejection ON (driven)), while all of the remaining second control electrodes 38 are brought into grounded levels (grounded state: ejection OFF) . On the other hand, in the case of the first control electrodes 36, all of the columns are simultaneously brought into their high voltage levels or grounded levels (ejection ON/OFF) depending on the image data. Consequently, the ejection/non-ejection of ink from the respective ejecting portions is controlled.

In other words, the ink Q is ejected in the form of the ink droplet R when the second control electrode 38 is at a high voltage level or in a high impedance state and the first control electrode 36 is at a high voltage level. However, no ink is ejected when at least one of the first control electrode 36 and the second control electrode 38 is at a grounded level.

The ink droplet R ejected from each of the ejecting portions is attracted to the recording medium P charged to a negative bias potential, so that the ink droplet R is attached to the predetermined place of the recording medium P to form an image. In addition, if required, any conventional means such as a heating roller pair may be used for heat fixation of an image.

When the underlying second control electrodes 38 are turned on row by row and the upper first control electrodes 36 are turned on/off depending on image data, the first control electrodes 36 are driven depending on the image data. Thus, the ejecting portions on both the sides of the center ejecting portions in the column direction frequently change the voltage levels of the first control electrodes 36 to high or grounded level. In this case, at the time of image recording, an influence of the electric field of adjacent ejecting portions can be eliminated by biasing the guard electrode 40 to a predetermined guard potential, for example a grounded level.

As another embodiment, the head 12 of the illustrated example may be configured such that the driving states of the first and second control electrodes 36, 38 are reversed. That is, the first control electrodes 36 are successively driven column by column and the second control electrodes 38 are driven depending on image data to eject the ink droplet R.

In this case, the first control electrodes 36 are driven column by column. Each of the ejecting portions in the column direction is defined as a center, and the first control electrodes 36 of the ejecting portions of the columns located on both the sides of the center are always at grounded levels. As a result, the first control electrode 36 of the ejecting portion on each of the columns located on both the sides of the center can play the role of the guard electrode 40. Consequently, when the first control electrodes 36 on the upper layer sequentially turn on column by column and the second control electrodes 38 on the lower layer are driven depending on image data, an influence of the adjacent ejecting portions can be eliminated and recording quality can be improved even thought the guard electrode 40 is not provided.

The head 12 is not limited as to whether the control of ink ejection/non-ejection is performed in one or both of the first control electrode 36 and the second control electrode 38. That is, the ejection of ink is carried out when the difference between the voltage level at the time of ink ejection/non-ejection on the control electrode side and the voltage level on the recording medium P side is larger than a predetermined level. On the other hand, when the difference is smaller than the predetermined level, the voltage on the control electrode side and the voltage on the recording medium P side may be suitably defined so that ink cannot be ejected.

Furthermore, in this embodiment, the colored fine particles in ink are positively charged and the recording medium side is charged to a negative high voltage. However, the present invention is not limited to such a configuration. In contrast, the colored fine particles in ink may be negatively charged and the recording medium P side may be charged to a positive high voltage. Consequently, for making the polarity of colored fine particles opposite to that in the above embodiment, the polarity of voltages applied to the opposing electrode 18, the charging unit 16 of the recording medium P, and the first control electrode 36 and the second control electrode 38 of each ejecting portion may be made opposite to that in the above embodiment.

In the inkjet recording method of the present invention, the electric field strength applied to the thread of the ink composition is not specifically limited but is preferably $1 \times 10^5$ to $3 \times 10^7$ V/m, more preferably $1 \times 10^6$ to $2.5 \times 10^7$ V/m. The ejection can be stabilized when the electric field strength is within these ranges. In addition, the electric field strength applied to the thread may be adjusted by, for example, a bias voltage or a pulse voltage for ejection.

In the inkjet recording method of the present invention, the amount of ink supplied per nozzle 38 (ejecting portion) is not specifically limited but is preferably $1 \times 10^{-6}$ to $1 \times 10^{-3}$ cc/sec, more preferably $5 \times 10^{-6}$ to $5 \times 10^{-4}$ cc/sec.

Furthermore, in the inkjet recording method of the present invention, the driving frequency for ink ejection (driving frequency of pulse supply) is not specifically limited but is preferably 5 kHz or more, more preferably 10 kHz or more. A driving frequency within these ranges is preferable because a high-quality image can be drawn and also such drawing can be performed at a high speed.

The ink composition and the inkjet recording method of the present invention have been described above in detail. However, the present invention is not limited to the above embodiments. The present invention may be modified or altered in a variety of ways within the gist of the present invention.

EXAMPLES

Hereinafter, the present invention will described in more detail with reference to specific examples of the present invention.

Example 1

The following materials were prepared:

Cyan pigment (colorant) [Phthalocyanine pigment, C. I. Pigment Blue (15:3) (LIONOL BLUE FG-7350, manufactured by Toyo Ink Mfg. Co., Ltd.);

Coating agent [AP-1];

Dispersant [BZ-2];

Charging regulator [CT-1]; and

Dispersion medium: Isopar G (manufactured by Exson Mobil Corporation).

The coating agent [AP-1], the dispersant [BZ-2], and the charging regulator [CT-1] have the following structural formulas:

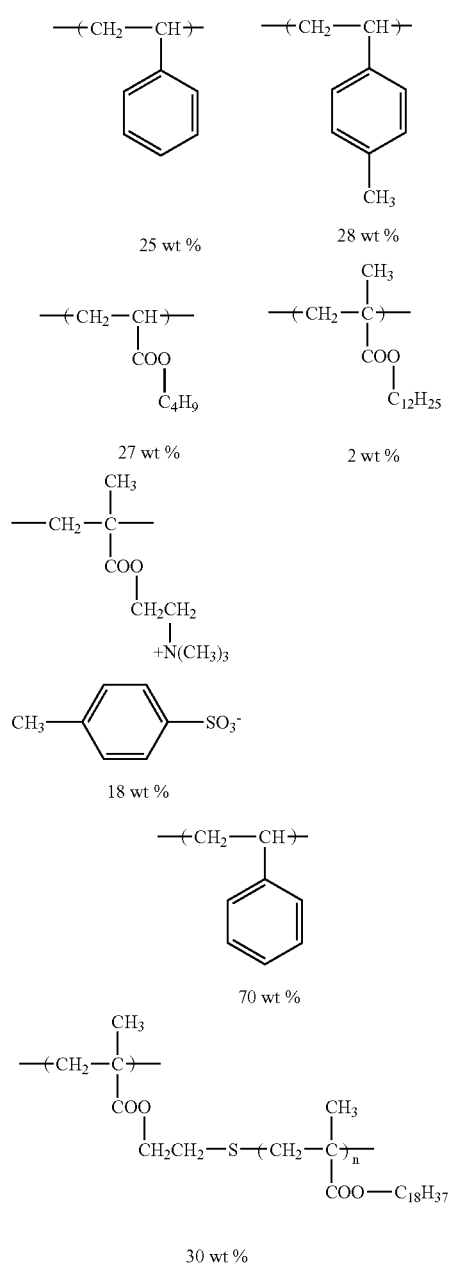

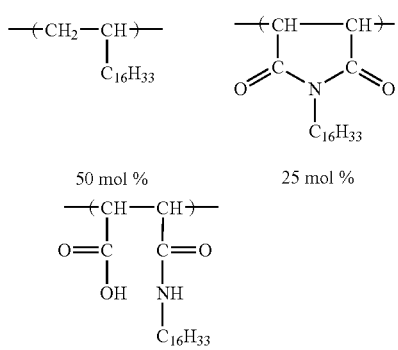

The coating agent [AP-1], the dispersant [BZ-2], and the charging regulator [CT-1] were synthesized as follows.

Coating Agent [AP-1]

Styrene, 4-methyl styrene, butyl acrylate, dodecyl methacrylate, and 2-(N,N-dimethylamino)ethyl methacrylate were radically polymerized using a known polymerization initiator and then reacted with methyl tosylate to obtain AP-1. The resulting AP-1 had a weight average molecular weight of 15,000, a polydispersity index (weight average molecular weight/number average molecular weight) of 2.7, a glass transition point (mid point) of 51° C., and a softening point of 46° C. (employing the strain gage method).

Dispersant [BZ-2]

Stearyl methacrylate was radically polymerized in the presence of 2-mercaptoethanol and was then reacted with methacrylic anhydride to obtain a stearyl methacrylate polymer having a methacryloyl group at its end (a weight average molecular weight of 7,600). Subsequently, the polymer was radically polymerized with styrene to obtain BZ-2. The resulting BZ-2 had a weight average molecular weight of 110,000.

Charging Regulator [CT-1]

1-hexadecyl amine was reacted with a 1-octadecene/maleic anhydride copolymer to obtain CT-1. The resulting CT-1 had a weight average molecular weight of 17,000.

Using the materials described above, an ink composition containing particles having a cyan colorant was prepared.

At first, 10 g of the cyan pigment and 20 g of the coating agent [AP-1] were placed in a disk-type kneader (PBV-0.1, manufactured by Irie Shokai Co., Ltd.). Then, a heater was set at 100° C. to mix them under heating for 2 hours. Subsequently, 30 g of the resulting mixture was roughly pulverized in a trio blender (manufactured by Trioscience Ltd.) and then finely pulverized by a sample mill (SK-M10, manufactured by Kyoritsu Riko Co., Ltd.).

30 g of the resulting fine pulverized product was subjected to preliminary dispersion in a paint shaker (manufactured by Toyo Seiki Seisaku-Sho, Ltd.) together with 7.5 g of the dispersant [BZ-2], 75 g of Isopar G, and glass beads of about 3.0 mm in diameter. After removal of the glass beads, the mixture was dispersed (pulverized) together with zirconia ceramic beads of about 0.6 mm in diameter in a dyno-mill (Type KDL, manufactured by Shinmaru Enterprises Corp.) at a rotational speed of 2,000 rpm while the inner temperature thereof was kept at 25° C. for 5 hours and then at 45° C. for 5 hours. The zirconia ceramic beads were removed from the resulting dispersion liquid. Then, the dispersion liquid was mixed with 316 g of Isopar G and 0.6 g of the charging regulator [CT-1], resulting in an ink composition (Example 1).

The ink composition thus obtained was subjected to the measurement of the volume average particle size using CAPA-700 (manufactured by Horiba, Ltd.) at a rotational speed of 5,000 rpm. The ink composition had a volume average diameter of 0.9 μm.

The electric conductivity of the ink composition at 20° C. was measured using an LCR meter (AG-4311, manufactured by Ando Electric Co., Ltd.) and a liquid electrode (LP-05, manufactured by Kawaguchi Electric Works Co., Ltd.) under the conditions of an applied voltage of 5 V and a frequency of 1 kHz (measurement A). In addition, using a small high-speed cooled centrifuge (SRX-201, manufactured by Tomy Seiko Co., Ltd.), the ink composition was centrifuged at a rotational speed of 14,500 rpm at 20° C. for 30 minutes to precipitate colorant particles, followed by measuring the electric conductivity of the resulting supernatant (measurement B). The electric conductivity C (i.e., (A−B)) of the colorant particles in the ink composition calculated from the measurements thus obtained was 70 nS/m.

Furthermore, 0.01% by mass of the charging regulator [CT-1] was added to the ink composition. Then, the electric conductivity Cx of the colorant particles in the ink composition after the addition of the charging regulator was calculated by the same way as described above was 75 nS/m. That is, (Cx−C)/C is 0.07. This result confirmed that the electric conductivity of the colorant particles in the ink composition was saturated.

Example 2

An ink composition (Example 2) was prepared by the same way as that of Example 1, except that 0.65 g of the charging regulator [CT-1] was added.

The resulting ink composition was subjected to the measurement of the volume average particle size, the electric conductivity C of colorant particles therein, and also the electric conductivity Cx of the colorant particles after the addition of 0.01% by mass of the charging regulator [CT-1] by the same way as that of Example 1.

Consequently, the volume average particle size was 0.9 μm, the electric conductivity C of the colorant particles was 75 nS/m, the electric conductivity Cx of the colorant particles after the addition of the charging regulator was 77 nS/m, and (Cx−C)/C was 0.03. This result confirmed that the electric conductivity of the colorant particles in the ink composition was saturated.

Example 3

An ink composition (Example 3) was prepared by the same way as that of Example 1 described above, except that the dispersion with the Type KDL dyno-mill manufactured by Shinmaru Enterprises Corp. was performed while the inner temperature was kept at 25° C. for 5 hours and then at 45° C. for 1 hour.

The resulting ink composition was subjected to the measurement of the volume average particle size, the electric conductivity C of colorant particles therein, and also the electric conductivity Cx of the colorant particles after the addition of 0.01% by mass of the charging regulator [CT-1] by the same way as that of Example 1.

Consequently, the volume average particle size was 0.5 μm, the electric conductivity C of the colorant particles was 130 nS/m, the electric conductivity Cx of the colorant particles after the addition of the charging regulator was 135 nS/m, and (Cx−C)/C was 0.04. This result confirmed that the electric conductivity of the colorant particles in the ink composition was saturated.

Comparative Example 1

An ink composition (Comparative Example 1) was prepared by the same way as that of Example 1 described above, except that 0.45 g of the charging regulator [CT-1] was added.

The resulting ink composition was subjected to the measurement of the volume average particle size, the electric conductivity C of colorant particles therein, and also the electric conductivity Cx of the colorant particles after the addition of 0.01% by mass of the charging regulator [CT-1] by the same way as that of Example 1.

Consequently, the volume average particle size was 0.9 μm, the electric conductivity C of the colorant particles was 50 nS/m, the electric conductivity Cx of the colorant particles after the addition of the charging regulator was 70 nS/m, and (Cx−C)/C was 0.4. This result confirmed that the electric conductivity of the colorant particles in the ink composition was not saturated.

Comparative Example 2

An ink composition (Comparative Example 2) was prepared by the same way as that of Example 3 described above, except that 0.45 g of the charging regulator [CT-1] was added.

The resulting ink composition was subjected to the measurement of the volume average particle size, the electric conductivity C of colorant particles therein, and also the electric conductivity Cx of the colorant particles after the addition of 0.01% by mass of the charging regulator [CT-1] by the same way as that of Example 1.

Consequently, the volume average particle size was 0.5 μm, the electric conductivity C of the colorant particles was 70 nS/m, the electric conductivity Cx of the colorant particles after the addition of the charging regulator was 120 nS/m, and (Cx−C)/C was 0.71. This result confirmed that the electric conductivity of the colorant particles in the ink composition was not saturated.

Measurement of Drawing Frequency

For each of the five different ink compositions thus obtained (Example 1 to Comparative Example 2), image drawing was performed using the recording apparatus 10 shown in FIGS. 1A to 3C. In addition, the followability of drawing dots to the drawing frequency was investigated and the recordable drawing frequency (the driving frequency of ink-ejection on/off) was then measured. The results are shown in Table 1.

Measurement of Minimum Dot Diameter

For each of the five different ink compositions thus obtained (Example 1 to Comparative Example 2), the dot diameter of a sample drawn using the recording apparatus 10 shown in FIGS. 1A to 3C with a pulse width modified by the frequency drawable with each ink was measured using a dot analyzer (DA-6000, manufactured by Oji Scientific Instruments Co., Ltd.). The minimum dot diameter was determined from the average value of 50 points. The difference of the minimum dot diameter was a value at σ=3. The results are shown in Table 1.

TABLE 1

|  | Example 1 | Example 2 | Example 3 | Comparative Example 1 | Comparative Example 2 |
|---|---|---|---|---|---|
| Volume average diameter of colorant particles [μm] | 0.9 | 0.9 | 0.5 | 0.9 | 0.5 |
| Electric conductivity C of particles [nS/m] | 70 | 75 | 130 | 50 | 70 |
| Electric conductivity Cx of particles after the addition of the charging regulator [nS/m] | 75 | 77 | 135 | 70 | 120 |
| (Cx-C)/C | 0.07 | 0.03 | 0.04 | 0.4 | 0.71 |
| Drawing frequency [kHz] | 10 | 15 | 10 | 1 | 1 |
| Recorded minimum dot diameter [μm] | 16 ± 5 | 16 ± 2 | 20 ± 3 | 50 ± 10 | 50 ± 10 |

As shown in Table 1 described above, according to the inkjet recording method of the present invention (Examples 1 to 3), which utilizes the ink composition of the present invention in which the electric conductivity of colorant particles in the ink composition is saturated, the drawing of an image can be carried out with much more excellent frequency responsivity than that in the conventional ink compositions (Comparative Examples 1 and 2) in the electrostatic inkjet image recording. In addition, the stability of dot diameter with an ink droplet is stable. In other words, an image with high quality can be drawn.

The above results have revealed the advantages of the present invention.

What is claimed is:

1. An ink composition used for inkjet recording, comprising:
   a dispersion medium;
   particles containing at least a colorant; and
   a charging regulator that generates charges on the particles,
   wherein an electric conductivity of the particles in the ink composition is saturated, and
   wherein the ink composition satisfies the following expression:

$(Cx-C)/C \leq 0.1$ wherein

A represents the electric conductivity of the ink composition;
   B represents the electric conductivity of the ink composition after removal of the colorant particles from the ink composition;
   C represents (A−B);
   Ax represents the electric conductivity of the ink composition after addition of the charging regulator in an amount of 0.01% by mass to the ink composition;
   Bx represents the electric conductivity of the ink composition after removal of the colorant particles from the ink composition to which the charging regulator was added in an amount of 0.01% by mass; and
   Cx represents (Ax−Bx).

2. The ink composition according to claim 1, wherein the charging regulator comprises a high molecular compound.

3. The ink composition according to claim 1, wherein the charging regulator has a carboxylic acid group.

4. The ink composition according to claim 2, wherein the charging regulator comprises a high molecular compound obtained by a reaction between a copolymer having at least one kind of monomer soluble in a non-aqueous solvent and maleic anhydride as structural units and one of a primary amino compound and a combination of a primary amino compound and a secondary amino compound, and said high molecular compound having a semi-maleic add amide component and a maleic imide component as repeating units.

5. The ink composition according to claim 1, wherein the particles are prepared by coating the colorant with a coating agent.

6. The ink composition according to claim 1, further comprising a dispersant for dispersing the particles in the dispersion medium.

7. The ink composition according to claim 6, wherein the dispersant comprises a polymer having a weight average molecular weight of 1,000 to 1,000,000, and a polydispersity index of 1.0 to 7.0.

8. An inkjet recording method, comprising
   acting electrostatic force on an ink composition which contains at least a dispersion medium, particles containing at least a colorant, and a charging regulator that generates charges on the particles and in which an electric conductivity of the particles is saturated; and
   ejecting an ink droplet of the ink compositions,
   wherein the ink composition satisfies the following expression:

$(Cx-C)/C \leq 0.1$ wherein

A represents the electric conductivity of the ink composition;
   B represents the electric conductivity of the ink composition after removal of the colorant particles from the ink composition;
   C represents (A−B);
   Ax represents the electric conductivity of the ink composition after addition of the charging regulator in an amount of 0.01% by mass to the ink composition;
   Bx represents the electric conductivity of the ink composition after removal of the colorant articles from the ink composition to which the charging regulator was added in an amount of 0.01% by mass; and
   Cx represents (Ax−Bx).

9. The inkjet recording method according to claim 8, wherein a thread of the ink composition is formed by the action of the electrostatic force on the ink composition, and the thread is disrupted to form and eject the ink droplet.

10. The inkjet recording method according to claim 8, wherein the ink droplet is ejected on a recording medium by acting the electrostatic force on the ink composition in a state where the recording medium is charged in an opposite polarity to that of the particles.

11. The inkjet recording method according to claim 8, wherein the charging regulator of the ink composition comprises a high molecular compound.

12. The inkjet recording method according to claim 8, wherein the charging regulator of the ink composition has a carboxylic acid group.

13. The inkjet recording method according to claim 11, wherein the charging regulator of the ink composition comprises a high molecular compound obtained by a reaction between a copolymer having as structural units at least one kind of monomer soluble in a non-aqueous solvent and maleic anhydride and one of a primary amino compound and a combination of a primary amino compound and a secondary amino compound, and said high molecular compound having a semi-maleic acid amide component and a maleic imide component as repeating units.

14. The inkjet recording method according to claim 8, wherein the particles of the ink composition are prepared by coating the colorant with a coating agent.

15. The inkjet recording method according to claim 8 wherein the ink composition contains a dispersant for dispersing the particles in the dispersion medium.

16. The inkjet recording method according to claim 15, wherein the dispersant in the ink composition comprises a polymer having a weight average molecular weight of 1,000 to 1,000,000, and a polydispersity index of 1.0 to 7.0.

* * * * *